(12) United States Patent
Zisimopoulos et al.

(10) Patent No.: US 12,401,991 B2
(45) Date of Patent: Aug. 26, 2025

(54) NETWORK-CONTROLLED DISABLING OF USER EQUIPMENT (UE) RADIO CAPABILITIES

(71) Applicant: QUALCOMM INCORPORATED, San Diego, CA (US)

(72) Inventors: Haris Zisimopoulos, London (GB); Lenaig Genevieve Chaponniere, La Jolla, CA (US); Sebastian Speicher, Wallisellen (CH); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 18/245,668

(22) PCT Filed: Oct. 13, 2021

(86) PCT No.: PCT/US2021/071833
§ 371 (c)(1),
(2) Date: Mar. 16, 2023

(87) PCT Pub. No.: WO2022/109510
PCT Pub. Date: May 27, 2022

(65) Prior Publication Data
US 2023/0362627 A1    Nov. 9, 2023

(30) Foreign Application Priority Data
Nov. 20, 2020  (GR) .............................. 20200100691

(51) Int. Cl.
*H04W 8/24*    (2009.01)
*H04W 60/00*   (2009.01)
*H04W 76/27*   (2018.01)

(52) U.S. Cl.
CPC ........... *H04W 8/245* (2013.01); *H04W 60/00* (2013.01); *H04W 76/27* (2018.02)

(58) Field of Classification Search
CPC ....... H04W 8/245; H04W 8/24; H04W 60/00; H04W 76/27; H04W 48/18
See application file for complete search history.

(56) References Cited

U.S. PATENT DOCUMENTS

| 2020/0213836 A1 * | 7/2020  | Kim ........................ H04W 8/24 |
| 2021/0345096 A1 * | 11/2021 | Shi ......................... H04W 8/24 |
| 2022/0109979 A1 * | 4/2022  | Liu ......................... H04W 8/24 |

OTHER PUBLICATIONS

3GPP TR 23.743 V16.0.0 (Mar. 2019): "3rd Generation Partnership Project, Technical Specification Group Services and System Aspects, Study on Optimisations on UE Radio Capability Signalling (Release 16)", 3GPP Standard, Technical Report, 3GPP TR 23.743, 3rd Generation Partnership Project, Mobile Competence Centre, 650, Route Des Lucioles, F-06921 Sophia-Antipolis Cedex, France, No. V16.0.0, Mar. 28, 2019, XP051722959, pp. 1-56, p. 10, chapter 6.1 p. 15, chapter 6.2.4.3, Section 6.5, Whole section 6.5.3.

(Continued)

*Primary Examiner* — Farid Seyedvosoghi
(74) *Attorney, Agent, or Firm* — Holland & Hart LLP

(57) ABSTRACT

Methods, systems, and devices for wireless communications are described. To communicate using non-restricted radio capabilities, a user equipment (UE) may transmit a UE capability message to a network (e.g., via a base station) that indicates a set of radio capabilities that the UE may use to communicate. The network may identify subscription information for the UE and may determine one or more restricted radio capabilities of the set of radio capabilities based on the subscription information for the UE. The network may transmit a message to the UE that includes a radio capability modification indication indicating the one or more restricted radio capabilities and a UE radio capability identifier cor- (Continued)

responding to the subset of radio capabilities of the set of radio capabilities that are not restricted. The UE may receive the message, identify the restricted radio capabilities, and communicate with the network using the subset of non-restricted radio capabilities.

30 Claims, 17 Drawing Sheets

(56) References Cited

OTHER PUBLICATIONS

"3rd Generation Partnership Project, Technical Specification Group Services and System Aspects, Procedures for the 5G System (5GS), Stage 2 (Release 16)", 3GPP Standard, 3GPP TS 23.502, 3rd Generation Partnership Project (3GPP), Mobile Competence Centre, 650, Route Des Lucioles, F-06921 Sophia-Antipolis Cedex, France, vol. SA WG2, No. V16.6.0, Sep. 24, 2020 (Sep. 24, 2020), pp. 1-597, XP051960894, Section 4.2.2.2.2 with reference to Fig. 4.2.2.2.2-1.

Huawei., et al., "Remaining Aspects and Signalling Procedure for UE Capability ID Report", 3GPP TSG-RAN2 Meeting#105, 3GPP Draft, R2-1901501 Remaining Aspects and Signalling Procedure for UE Capability ID Report, 3rd Generation Partnership Project, Mobile Competence Centre, 650, Route Des Lucioles, F-06921 Sophia-Antipolis Cedex, France, vol. RAN WG2, No. Athens, Greece, Feb. 25, 2019- Mar. 1, 2019, Feb. 14, 2019, 9 Pages, XP051602859, Whole section 2, figure 6.

Intel Corporation: "RRC Signaling Impact from RAGS", 3GPP Draft, R2-1910456, 3rd Generation Partnership Project (3GPP), Mobile Competence Centre, 650, Route Des Lucioles, F-06921 Sophia-Antipolis Cedex, France, vol. RAN WG2, No. Prague, Czech, Aug. 26, 2019-Aug. 30, 2019, Aug. 16, 2019 (Aug. 16, 2019), 3 Pages, XP051768234, Whole sections 2, figure 1.

Intel: "On Remaining Open Issues for FS_RACS", SA WG2 Meeting #S2-131, S2-1902914_Email_REV4_S2-1902539_RACS_DISC, 3GPP Draft, R2-1901501 Remaining Aspects and Signalling Procedure for UE Capability ID Report, 3rd Generation Partnership Project, Mobile Competence Centre, 650, Route Des Lucioles, F-06921 Sophia-Antipolis Cedex, France, vol. SA WG2, No. Santa Cruz—Tenerife, Feb. 25, 2019-Mar. 1, 2019, Mar. 8, 2019, pp. 1-13, XP051697451, Whole sections 2 & 3, figure 3a.

International Search Report and Written Opinion—PCT/US2021/071833—ISA/EPO—Feb. 4, 2022.

* cited by examiner

NETWORK-CONTROLLED DISABLING OF USER EQUIPMENT (UE) RADIO CAPABILITIES

CROSS REFERENCE

The present application is a 371 national stage filing of International PCT Application No. PCT/US2021/071833 by Zisimopoulos et al. entitled "NETWORK-CONTROLLED DISABLING OF USER EQUIPMENT (UE) RADIO CAPABILITIES," filed Oct. 13, 2021; and claims priority to International Patent Application No. 20200100691 by Zisimopoulos et al. entitled "NETWORK-CONTROLLED DISABLING OF USER EQUIPMENT (UE) RADIO CAPABILITIES," filed Nov. 20, 2020, each of which is assigned to the assignee hereof, and each of which is expressly incorporated by reference in its entirety herein.

FIELD OF TECHNOLOGY

The following relates to wireless communications, including network-controlled disabling of user equipment (UE) radio capabilities.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may support communications with a network (e.g., via a base station) using multiple radio capabilities such as 4G capabilities, 5G capabilities, evolved packet system (EPS) capabilities, narrowband-internet-of-things (NB-IoT) capabilities, or other supported radio capabilities. In some cases, a UE may be restricted from communicating according to one or more radio capabilities, for example, based on a subscription of the UE. However, in some examples, the UE may autonomously reselect or be directed by the network to communicate according to a restricted radio capability, and the network may subsequently reject the UE from communicating according to the restricted radio capability. Thus, the UE may suffer increased latency and power loss due to attempting to communicate according to a restricted radio capability.

SUMMARY

The described techniques relate to improved methods, systems, devices, and apparatuses that support network-controlled disabling of user equipment (UE) radio capabilities. Generally, the described techniques provide for preventing a UE from attempting to communicate according to a restricted radio capability. For example, some UEs may support multiple radio capabilities and may communicate according to one or more of the supported radio capabilities. In some examples, a UE that supports multiple radio capabilities may establish a connection with (e.g., register with) a network (e.g., a core network). During registration, the UE may transmit a UE capability message indicating a set of radio capabilities supported by the UE. The network may receive the UE capability message (e.g., via a base station) and may identify subscription information associated with the UE that includes one or more radio capabilities restricted to the UE. Based on the subscription information, the network may apply a filter to the set of radio capabilities to remove the one or more restricted radio capabilities from the set of radio capabilities. The network may transmit a message to the UE that includes a radio capability modification indication indicating the one or more restricted radio capabilities and a UE radio capability identifier corresponding to the filtered set of radio capabilities. The UE may receive the message and may identify the radio capabilities restricted by the network based on the message. The UE may disable the one or more restricted radio capabilities based on the radio capability modification indication and may communicate with the network according to one or more radio capabilities of the filtered set of radio capabilities (e.g., the non-restricted radio capabilities).

A method for wireless communications at a UE is described. The method may include transmitting, to a network via a base station, a UE capability message indicating a set of UE radio capabilities, receiving, from the network via the base station, a message indicating a UE radio capability identifier and a radio capability modification indication, where the UE radio capability identifier corresponds to a subset of the set of UE radio capabilities based on the radio capability modification indication indicating one or more UE radio capabilities to restrict from the set of UE radio capabilities, and communicating with the network based on the subset of the set of UE radio capabilities corresponding to the UE radio capability identifier.

An apparatus for wireless communications at a UE is described. The apparatus may include a processor and a memory coupled with the processor, with instructions stored in the memory. The instructions may be executable by the processor to cause the apparatus to transmit, to a network via a base station, a UE capability message indicating a set of UE radio capabilities, receive, from the network via the base station, a message indicating a UE radio capability identifier and a radio capability modification indication, where the UE radio capability identifier corresponds to a subset of the set of UE radio capabilities based on the radio capability modification indication indicating one or more UE radio capabilities to restrict from the set of UE radio capabilities, and communicate with the network based on the subset of the set of UE radio capabilities corresponding to the UE radio capability identifier.

Another apparatus for wireless communications at a UE is described. The apparatus may include means for transmitting, to a network via a base station, a UE capability message indicating a set of UE radio capabilities, means for receiving, from the network via the base station, a message indicating a UE radio capability identifier and a radio capability modification indication, where the UE radio capability identifier corresponds to a subset of the set of UE radio capabilities based on the radio capability modification indication indicating one or more UE radio capabilities to restrict from the set of UE radio capabilities, and means for communicating with the network based on the subset of the set of UE radio capabilities corresponding to the UE radio capability identifier.

A non-transitory computer-readable medium storing code for wireless communications at a UE is described. The code may include instructions executable by a processor to transmit, to a network via a base station, a UE capability message indicating a set of UE radio capabilities, receive, from the network via the base station, a message indicating a UE radio capability identifier and a radio capability modification indication, where the UE radio capability identifier corresponds to a subset of the set of UE radio capabilities based on the radio capability modification indication indicating one or more UE radio capabilities to restrict from the set of UE radio capabilities, and communicate with the network based on the subset of the set of UE radio capabilities corresponding to the UE radio capability identifier.

Some examples of the method, apparatuses, and non-transitory computer-readable medium described herein may further include operations, features, means, or instructions for disabling the one or more UE radio capabilities for a serving public land mobile network (PLMN) corresponding to the UE radio capability identifier based on the radio capability modification indication.

Some examples of the method, apparatuses, and non-transitory computer-readable medium described herein may further include operations, features, means, or instructions for refraining from reselecting to a radio access technology (RAT) or system corresponding to one of the one or more UE radio capabilities based on the radio capability modification indication.

Some examples of the method, apparatuses, and non-transitory computer-readable medium described herein may further include operations, features, means, or instructions for storing a mapping from a set of multiple radio capability modification indication values to a set of multiple respective sets of UE radio capabilities to restrict from the set of UE radio capabilities and determining the one or more UE radio capabilities based on the radio capability modification indication and the mapping.

Some examples of the method, apparatuses, and non-transitory computer-readable medium described herein may further include operations, features, means, or instructions for receiving a configuration message configuring the UE with the mapping.

In some examples of the method, apparatuses, and non-transitory computer-readable medium described herein, the mapping may be operator-specific.

Some examples of the method, apparatuses, and non-transitory computer-readable medium described herein may further include operations, features, means, or instructions for entering an idle mode, where the communicating with the network based on the subset of the set of UE radio capabilities corresponding to the UE radio capability identifier may be subsequent to entering the idle mode.

Some examples of the method, apparatuses, and non-transitory computer-readable medium described herein may further include operations, features, means, or instructions for performing a registration process with the base station to register to the network, where the radio capability modification indication corresponds to subscription information for the UE based on the registration process.

In some examples of the method, apparatuses, and non-transitory computer-readable medium described herein, the message indicating the UE radio capability identifier and the radio capability modification indication includes a registration accept message, a UE configuration update message, a tracking area update (TAU) accept message, an attach accept message, a globally unique temporary identifier (GUTI) re-allocation message, or any combination thereof and the radio capability modification indication includes a bit field of the message.

In some examples of the method, apparatuses, and non-transitory computer-readable medium described herein, the one or more UE radio capabilities include one or more restricted RATs, one or more restricted bands for a specific RAT, or any combination thereof.

A method for wireless communications at a network device is described. The method may include receiving, from a UE, a UE capability message indicating a set of UE radio capabilities, determining a radio capability modification indication for the UE based on subscription information for the UE, the radio capability modification indication indicating one or more UE radio capabilities to restrict from the set of UE radio capabilities, transmitting, to the UE, a message indicating a UE radio capability identifier and the radio capability modification indication, where the UE radio capability identifier corresponds to a subset of the set of UE radio capabilities based on the one or more UE radio capabilities, and communicating with the UE based on the subset of the set of UE radio capabilities corresponding to the UE radio capability identifier.

An apparatus for wireless communications at a network device is described. The apparatus may include a processor and a memory coupled with the processor, with instructions stored in the memory. The instructions may be executable by the processor to cause the apparatus to receive, from a UE, a UE capability message indicating a set of UE radio capabilities, determine a radio capability modification indication for the UE based on subscription information for the UE, the radio capability modification indication indicating one or more UE radio capabilities to restrict from the set of UE radio capabilities, transmit, to the UE, a message indicating a UE radio capability identifier and the radio capability modification indication, where the UE radio capability identifier corresponds to a subset of the set of UE radio capabilities based on the one or more UE radio capabilities, and communicate with the UE based on the subset of the set of UE radio capabilities corresponding to the UE radio capability identifier.

Another apparatus for wireless communications at a network device is described. The apparatus may include means for receiving, from a UE, a UE capability message indicating a set of UE radio capabilities, means for determining a radio capability modification indication for the UE based on subscription information for the UE, the radio capability modification indication indicating one or more UE radio capabilities to restrict from the set of UE radio capabilities, means for transmitting, to the UE, a message indicating a UE radio capability identifier and the radio capability modification indication, where the UE radio capability identifier corresponds to a subset of the set of UE radio capabilities based on the one or more UE radio capabilities, and means for communicating with the UE based on the subset of the set of UE radio capabilities corresponding to the UE radio capability identifier.

A non-transitory computer-readable medium storing code for wireless communications at a network device is described. The code may include instructions executable by a processor to receive, from a UE, a UE capability message indicating a set of UE radio capabilities, determine a radio capability modification indication for the UE based on subscription information for the UE, the radio capability modification indication indicating one or more UE radio capabilities to restrict from the set of UE radio capabilities, transmit, to the UE, a message indicating a UE radio capability identifier and the radio capability modification indication, where the UE radio capability identifier corresponds to a subset of the set of UE radio capabilities based on the one or more UE radio capabilities, and communicate with the UE based on the subset of the set of UE radio capabilities corresponding to the UE radio capability identifier.

Some examples of the method, apparatuses, and non-transitory computer-readable medium described herein may further include operations, features, means, or instructions for performing a registration process with the UE to register the UE to a network and determining the subscription information for the UE based on the registration process.

Some examples of the method, apparatuses, and non-transitory computer-readable medium described herein may further include operations, features, means, or instructions for inputting, into a UE radio capability management function (UCMF), at least the set of UE radio capabilities and mobility restriction information corresponding to the subscription information for the UE and assigning, by the UCMF, the UE radio capability identifier to the subset of the set of UE radio capabilities based on the mobility restriction information.

Some examples of the method, apparatuses, and non-transitory computer-readable medium described herein may further include operations, features, means, or instructions for applying a filter, at the UCMF, to remove the one or more UE radio capabilities from the set of UE radio capabilities to obtain the subset of the set of UE radio capabilities, where the filter corresponds to the mobility restriction information and the assigning the UE radio capability identifier to the subset of the set of UE radio capabilities may be based on the applied filter.

Some examples of the method, apparatuses, and non-transitory computer-readable medium described herein may further include operations, features, means, or instructions for selecting the filter from a set of multiple filters corresponding to a set of multiple respective enumerated mobility restriction values.

Some examples of the method, apparatuses, and non-transitory computer-readable medium described herein may further include operations, features, means, or instructions for outputting, from the UCMF, the UE radio capability identifier and the radio capability modification indication based on the assigning the UE radio capability identifier to the subset of the set of UE radio capabilities.

Some examples of the method, apparatuses, and non-transitory computer-readable medium described herein may further include operations, features, means, or instructions for retrieving, from unified data management (UDM) or a home subscriber service (HSS), the subscription information for the UE by an access and mobility management function (AMF) or a mobility management entity (MME), where at least the set of UE radio capabilities and the mobility restriction information may be input into the UCMF by the AMF or the MME.

In some examples of the method, apparatuses, and non-transitory computer-readable medium described herein, the mobility restriction information includes an enumerated value indicating closed access group (CAG)-only, Long Term Evolution (LTE) restricted, evolved packet system (EPS) restricted, New Radio (NR) restricted, fifth generation (5G) system restricted, global system for mobile communications edge radio access network restricted (GERAN), universal mobile telecommunications system (UMTS) restricted, an operator-specific restriction, or any combination thereof.

Some examples of the method, apparatuses, and non-transitory computer-readable medium described herein may further include operations, features, means, or instructions for determining a subscription update for one or more subscription parameters of the subscription information for the UE, updating the radio capability modification indication for the UE based on the subscription update, the updated radio capability modification indication indicating an updated one or more UE radio capabilities to restrict from the set of UE radio capabilities, and transmitting, to the UE, a second message indicating an updated UE radio capability identifier and the updated radio capability modification indication, where the updated UE radio capability identifier corresponds to an updated subset of the set of UE radio capabilities based on the updated one or more UE radio capabilities.

Some examples of the method, apparatuses, and non-transitory computer-readable medium described herein may further include operations, features, means, or instructions for refraining from redirecting the UE to a RAT or system corresponding to one of the one or more UE radio capabilities based on the radio capability modification indication.

Some examples of the method, apparatuses, and non-transitory computer-readable medium described herein may further include operations, features, means, or instructions for storing a mapping from a set of multiple sets of UE radio capabilities to restrict from the set of UE radio capabilities to a set of multiple respective radio capability modification indication values and determining the radio capability modification indication based on the one or more UE radio capabilities and the mapping.

Some examples of the method, apparatuses, and non-transitory computer-readable medium described herein may further include operations, features, means, or instructions for transmitting, to the UE, a configuration message configuring the UE with the mapping.

In some examples of the method, apparatuses, and non-transitory computer-readable medium described herein, the mapping may be operator-specific.

In some examples of the method, apparatuses, and non-transitory computer-readable medium described herein, the message indicating the UE radio capability identifier and the radio capability modification indication includes a registration accept message, a UE configuration update message, a TAU accept message, an attach accept message, a GUTI re-allocation message, or any combination thereof and the radio capability modification indication includes a bit field of the message.

In some examples of the method, apparatuses, and non-transitory computer-readable medium described herein, the one or more UE radio capabilities include one or more restricted RATs, one or more restricted bands for a specific RAT, or any combination thereof.

DETAILED DESCRIPTION

Figure 1:
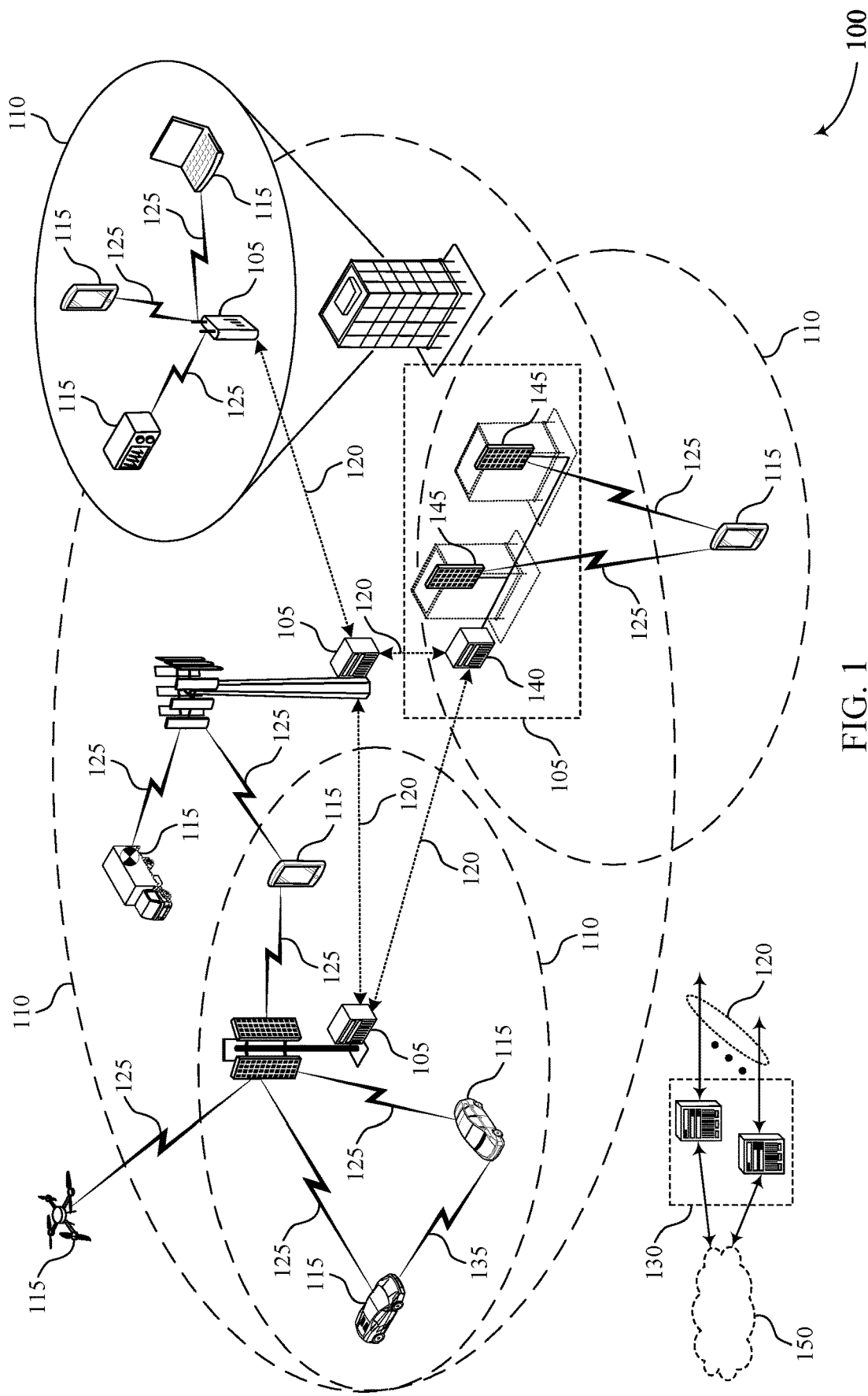
FIGS. 1 through 3 illustrate examples of wireless communications systems that support network-controlled disabling of user equipment (UE) radio capabilities in accordance with aspects of the present disclosure.

Some wireless communications systems may include communication devices, such as a user equipment (UE) and a base station, that may support multiple radio capabilities, such as fourth generation (4G) (e.g., Long Term Evolution (LTE)) capabilities, and fifth generation (5G) (e.g., New Radio (NR)) capabilities, among other radio capabilities. In some examples, a UE may communicate with a network via a base station according to a first radio capability and may autonomously reselect or be directed by the network to communicate according to a second radio capability. However, in some cases, the UE may be restricted from communicating according to the second radio capability based on a subscription of the UE. For example, the UE may be restricted from using an LTE system based on the UE's subscription, but the UE may attempt to reselect to the LTE system because the UE is capable of communicating using the LTE system and is unaware of the restriction. The network may subsequently reject the UE from reselecting to the LTE system and, in some cases, may allocate a timer to the UE to prevent the UE from attempting to reselect to the LTE system for a time period. Thus, attempting to reselect to a system corresponding to a restricted radio capability may increase latency, channel overhead, and power loss due to increased and unnecessary signaling between the UE and the network.

Techniques, systems, and devices are described herein to indicate restricted radio capabilities to a UE to prevent the UE from attempting to reselect to a restricted radio capability. For example, a UE that supports multiple radio capabilities may establish a connection with (e.g., register with) a network (e.g., a core network). During registration, the UE may transmit a UE capability message indicating a set of radio capabilities supported by the UE. The network (e.g., a network device or other network entity) may receive the UE capability message (e.g., via a base station) and may identify subscription information associated with the UE that includes one or more radio capabilities restricted to the UE. The network may use the subscription information to determine a radio capability modification indication indicating the one or more restricted radio capabilities and to determine a UE radio capability identifier for the UE. The UE radio capability identifier may correspond to a subset of radio capabilities of the set of radio capabilities that are not restricted. The network may transmit a message (e.g., a non-access stratum (NAS) message) to the UE that indicates the UE radio capability identifier and the radio capability modification indication.

The UE may communicate with the network according to one or more radio capabilities of the subset of radio capabilities. For example, the UE may receive the message and may disable the one or more restricted radio capabilities. The UE may select a radio access technology (RAT) or a system corresponding to an enabled radio capability and may communicate with the network using the selected RAT or system. Additionally or alternatively, the UE may communicate with the network using a RAT or a system and may refrain from reselecting to a RAT or system corresponding to one of the one or more restricted radio capabilities based on receiving the radio capability modification indication.

Aspects of the subject matter described in this disclosure may be implemented to realize one or more of the following potential improvements, among others. The techniques employed by the UE may provide benefits and enhancements to the operation of the UE. For example, operations performed by the UE may provide improvements to mobility management operations. In some examples, receiving, from the network, an indication of restricted radio capabilities may prevent the UE from attempting to communicate according to a restricted radio capability. In some other examples, the network indicating the restricted radio capabilities may provide improvements to latency, power consumption, spectral efficiency, and, in some examples, may promote highly reliable communications, among other benefits.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to network-controlled disabling of UE radio capabilities.

FIG. 1 illustrates an example of a wireless communications system 100 that supports network-controlled disabling of UE radio capabilities in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to any combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or any combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage NAS functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may support communications with a base station 105 according to multiple radio capabilities. For example, a radio capability may support a RAT or a system that the UE 115 may use to communicate with a network (e.g., the core network 130) via the base station 105. Examples of such RATs and systems may include LTE systems, LTE-A systems, LTE-A Pro systems, LTE for machines (LTE-M) systems, 4G systems, NR systems, 5G systems, Evolved Universal Terrestrial Radio Access Networks (E-UTRAN), EPSs, global system for mobile communications edge radio access networks (GERAN), E-UTRA connected to 5GC, Universal Mobile Telecommunications Systems (UMTS), and NB-IoT interfaces, among other RATs and systems.

In some cases, the UE 115 may communicate with a base station 105 according to a first radio capability (e.g., using a 5G system) and may autonomously reselect or be directed by a core network 130 to communicate with the base station 105 or another base station 105 according to a second radio capability (e.g., using an LTE system). However, in some cases, the UE 115 may be restricted from communicating according to the second radio capability based on a subscription of the UE 115. For example, if the subscription for the UE 115 indicates that the UE 115 is a closed access group (CAG) only UE, the UE 115 may be restricted from using an LTE system or an EPS. The UE 115 may be unaware of the restriction and may attempt to reselect to a RAT or system corresponding to the second radio capability because the UE supports the radio capability for communicating using the corresponding RAT or system. The core network 130 may subsequently reject the UE 115 (e.g., based on the UE's subscription restricting the UE from using the second radio capability) and, in some cases, may allocate a timer to the UE 115 to prevent the UE 115 from attempting to reselect to the corresponding RAT or system for a time period. However, the UE 115 may continue to attempt to reselect to the RAT or system corresponding to the restricted radio capability following expiration of the timer. Additionally or alternatively, if the UE 115 switches to another public land mobile network (PLMN) and switches back, the UE 115 may repeat the attempt to select the RAT or system corresponding to the restricted radio capability. Attempting to reselect to a RAT or system corresponding to a restricted radio capability may increase latency, channel overhead, and power loss due to increased signaling between the UE and the base station that ultimately results in a failed reselection process to the RAT or system.

Various aspects of the described techniques support network controlled disabling of radio capabilities supported by the UE 115. For example, the UE 115 may transmit a UE capability message to the core network 130 via the base station 105. The UE capability message may indicate a set of radio capabilities supported by the UE 115, and, in some examples, may be transmitted as part of a registration process to register the UE 115 to the core network 130. The core network 130 may receive the UE capability message and may identify subscription information associated with the UE 115 that includes one or more radio capabilities restricted to the UE 115. The core network 130 may use the subscription information to determine a radio capability modification indication indicating the one or more restricted radio capabilities and to determine a UE radio capability identifier for the UE 115. The UE radio capability identifier may correspond to a subset of radio capabilities of the set of radio capabilities that are not restricted. The core network 130 may transmit a message (e.g., a NAS message via the base station 105) to the UE 115 that indicates the UE radio capability identifier and the radio capability modification indication. The UE 115 may receive the message and communicate with the base station 105 according to a radio capability of the subset of radio capabilities (e.g., the non-restricted radio capabilities). Based on identifying the restricted radio capabilities from the radio capability modification indication, the UE 115 may refrain from reselecting to a RAT or system corresponding to a restricted radio capability.

Figure 2:
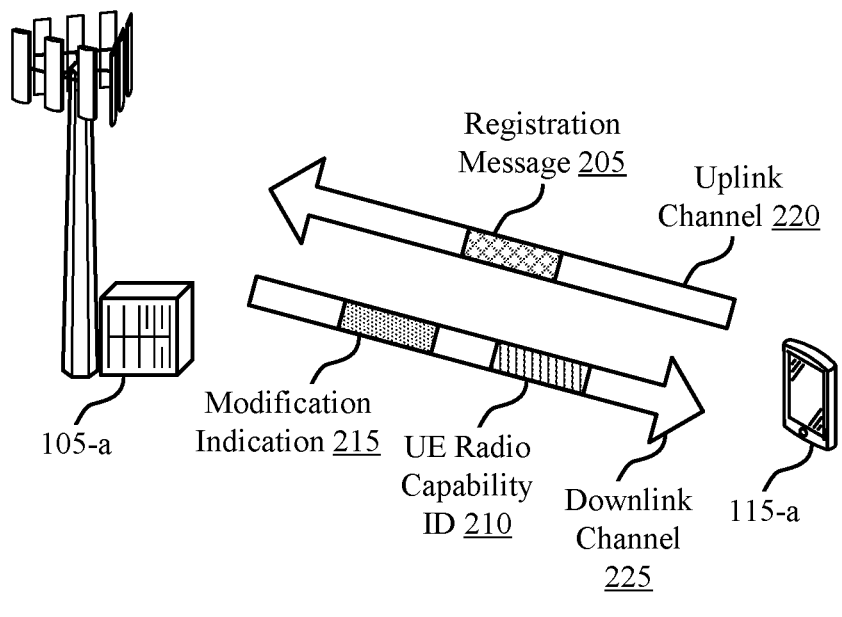

FIG. 2 illustrates an example of a wireless communications system 200 that supports network-controlled disabling of UE radio capabilities in accordance with aspects of the present disclosure. In some examples, the wireless communications system 200 may implement aspects of the wireless communications system 100. For example, the wireless communications system 200 may include a base station 105-*a* and a UE 115-*a*, which may be examples of a base station 105 and a UE 115 as described with reference to FIG. 1. In some examples, the wireless communications system 200 may support one or more RATs including 4G systems such as LTE systems, LTE-A systems, or LTE-A Pro systems, 5G systems which may be referred to as NR systems, or any combination of these or other RATs. In some cases, the base station 105-*a* may implement a UE radio capability identifier (ID) 210 and a modification indication 215, and the UE 115-*a* may implement a registration message 205 to support network-controlled radio capability restriction.

The base station 105-*a* and the UE 115-*a* may communicate using an uplink channel 220 and a downlink channel 225. For example, the UE 115-*a* may transmit uplink messages to the base station 105-*a* via the uplink channel 220 and may receive downlink messages from the base station 105-*a* via the downlink channel 225. In some examples, the UE 115-*a* and the base station 105-*a* may communicate according to one or more radio capabilities. For example, the UE 115-*a* may support communications with the base station 105-*a* using various RATs or systems (e.g., 4G systems, 5G systems, or some other RAT or system).

The UE 115-*a* may transmit a registration message 205 to the base station 105-*a* via the uplink channel 220 to initiate a registration process. The UE 115-*a* may initiate the registration process to register with a network (e.g., a core network 130) that is connected to the base station 105-*a*. The UE 115-*a* may include a UE capability message (e.g., with the registration message 205) that indicates a set of radio capabilities supported by the UE 115-*a*. In some examples, the UE 115-*a* may transmit the UE capability message as a different message than the registration message 205. In some other examples, the registration message 205 may include aspects of the UE capability message.

The base station 105-*a* may receive the registration message 205 and forward the registration message 205 to the network. The network may identify subscription information associated with the UE 115-*a* in response to receiving the registration message. In some examples, the subscription information may indicate one or more radio capabilities that are restricted to the UE 115-*a*. For example, the subscription information may indicate that the UE 115-*a* is CAG-only (e.g., LTE and EPS restricted), LTE restricted, EPS restricted, NR restricted, 5G restricted, GERAN restricted, UMTS restricted, NB-IoT restricted, operator-specific restricted, E-UTRAN restricted, or any combination thereof. If the UE 115-*a* is NR restricted, for example, the UE 115-*a* may not be allowed to use an NR system to communicate with the base station 105-*a* while operating according to a specific subscription.

The network may remove the one or more restricted radio capabilities from the set of radio capabilities based on the identified subscription information. For example, the network may apply a filter to the set of radio capabilities corresponding to the one or more restricted radio capabilities to obtain a subset of radio capabilities of the set of radio capabilities that does not include the restricted radio capabilities. The network may determine a UE radio capability ID 210 corresponding to the subset of radio capabilities and may determine a modification indication 215 indicating the one or more restricted radio capabilities. Alternatively, the modification indication 215 may indicate the non-restricted radio capabilities (e.g., the subset of radio capabilities).

The network may forward the UE radio capability ID 210 and the modification indication 215 to the base station 105-*a*, and the base station 105-*a* may transmit a message including the UE radio capability ID 210 and the modification indication 215 to the UE 115-*a*. In some examples, the base station 105-*a* may include the UE radio capability ID 210 and the modification indication 215 in a registration accept message, a UE configuration update message, a tracking area update (TAU) accept message, an attach accept message, a globally unique temporary identifier (GUTI) re-allocation message, or any combination thereof. In some cases, the modification indication 215 may be indicated in a bit field of the message.

The UE 115-a may disable the one or more restricted radio capabilities based on receiving the modification indication 215. For example, the UE 115-a may store a mapping from a set of modification indication values to a number of respective sets of restricted radio capabilities. The UE 115-a may determine the value of the modification indication 215 and may map the modification indication value to a respective set of restricted radio capabilities. The UE 115-a may disable the radio capabilities corresponding to the set of restricted radio capabilities. In some examples, the UE 115-a may receive the mapping in a configuration message transmitted by the base station 105-a. In some cases, the mapping may be operator-specific. In some examples, a mapping (e.g., an operator-specific mapping) may support a band-level granularity or other reduced granularity of restriction for a radio capability. For example, a mapping (e.g., an operator-specific mapping) may support the network disabling one or more bands of a particular RAT rather than disabling the RAT entirely.

In some examples, the UE 115-a may disable the one or more restricted radio capabilities while using the UE radio capability ID 210. For example, the UE radio capability ID 210 may be associated with a particular serving PLMN. If the UE 115-a connects to a different PLMN, the UE 115-a may initiate a registration process for the different PLMN. The UE 115-a may enable the previously disabled radio capabilities. The UE 115-a may receive a new UE radio capability ID 210 and a new modification indication 215 and may disable one or more restricted radio capabilities of the set of radio capabilities based on receiving the new modification indication 215.

In some examples, the UE 115-a may receive the UE radio capability ID 210 and the modification indication 215 while operating in a connected mode with the network. The UE 115-a may continue to operate according to a full set of radio capabilities while in the connected mode (e.g., despite receiving the modification indication 215 indicating restricted radio capabilities) until entering an idle mode. The UE 115-a may enter the idle mode when the UE 115-a does not have data to communicate with the network. The UE 115-a may disable the one or more restricted radio capabilities upon entering the idle mode or subsequent to entering the idle mode, such that when the UE 115-a reenters the connected mode, the UE 115-a may operate according to the subset of radio capabilities (e.g., with the restricted radio capabilities disabled).

The UE 115-a may refrain from reselecting to a RAT or a system corresponding to the one or more restricted radio capabilities based on receiving the modification indication 215. For example, the modification indication may indicate the one or more radio capabilities that are restricted to the UE 115-a. Therefore, the UE 115-a may be aware of the one or more restricted radio capabilities and may refrain from reselecting to a RAT or a system corresponding to the one or more restricted radio capabilities (e.g., based on an autonomous reselection process at the UE 115-a or a reselection command from the network).

Figure 3:
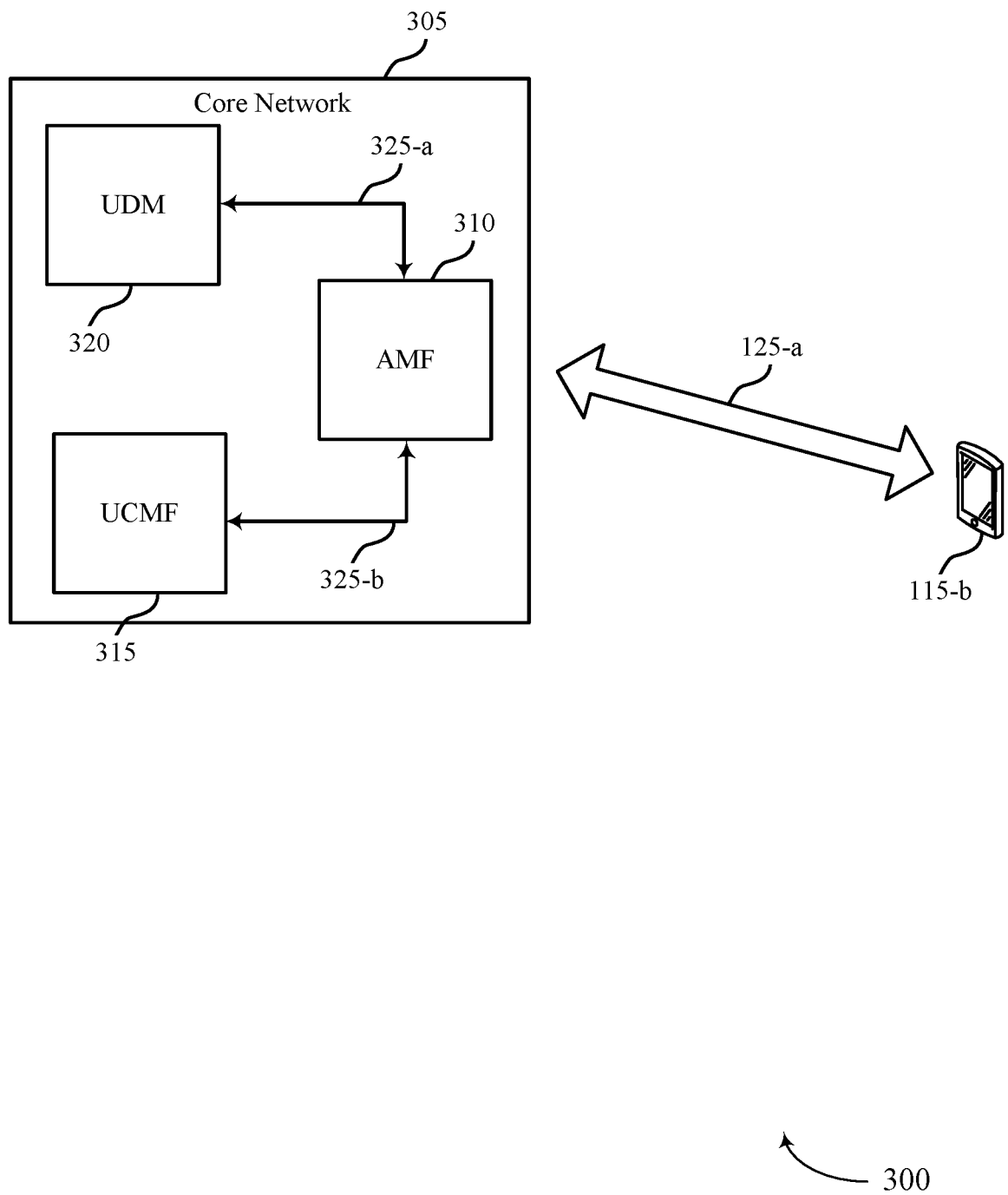

FIG. 3 illustrates an example of a wireless communications system 300 that supports network-controlled disabling of UE radio capabilities in accordance with aspects of the present disclosure. In some examples, the wireless communications system 300 may implement aspects of the wireless communications systems 100 and 200. For example, the wireless communications system 300 may include a core network 305 and a UE 115-b. The core network 305 may be an example of a core network 130 as described with reference to FIG. 1, and the UE 115-b may be an example of a UE 115 as described with reference to FIGS. 1 and 2. In some examples, the wireless communications system 300 may support one or more RATs including 4G systems such as LTE systems, LTE-A systems, or LTE-A Pro systems, 5G systems which may be referred to as NR systems, or any combination of these or other RATs (e.g., higher generation RATs, lower generation RATs, or both).

The core network 305 may include multiple network entities (e.g., functions) to facilitate communications with the UE 115-b. For example, the core network 305 may include an AMF 310, a UE radio capability management function (UCMF) 315, and a unified data management (UDM) 320, among other network devices or network entities (not shown), to facilitate communications with the UE 115-b. In some cases, the AMF 310, the UCMF 315, and the UDM 320 may communicate over one or more links 325. For example, the AMF 310 may communicate with the UDM 320 using link 325-a and the UCMF using link 325-b. In some examples, the AMF 310, UCMF 315, UDM 320, or any combination thereof may be implemented in hardware, software, firmware, or some combination thereof.

The AMF 310 may provide access and mobility management services for the UE 115-b and a base station 105 (not shown) through which the UE 115-b communicates with the core network 305. In some examples, the AMF 310 may serve as the primary point of control plane signaling communications with the UE 115-b, such that a majority of control plane communications between the UE 115-b and the core network 305 may pass through the AMF 310. Additionally or alternatively, the AMF 310 may facilitate authentication and/or authorization of the UE 115-b, such that the UE 115-b may communicate with the core network 305 using NAS protocols configured to securely establish and maintain connectivity between the UE 115-b and the core network 305. In some cases, the core network 305 may include an MME or some other mobility management function in addition or alternative to the AMF 310.

The UCMF 315 may store radio capability ID mappings in a network (e.g., a PLMN) serving the UE 115-b. In some cases, a PLMN may be a network that includes one or more RATs or systems supported by a specific operator (e.g., in a specific country) and may provide services (e.g., voice calls, messaging services, data services, or other services) to the UE 115-b. The UCMF 315 may be responsible for assigning radio capability IDs in a PLMN. Additionally, the UCMF 315 may store radio capability IDs and the radio capability information to which the radio capability IDs map. In some examples, a radio capability ID stored in the UCMF may be associated with one or more radio capability formats. The radio capability formats may be identifiable by the UCMF 315 and the AMF 310, and, in some examples, the UCMF 315 may be configured to transcode between radio capability formats. For example, if a radio capability format is encoded in Abstract Syntax Notation One (ASN.1), the UCMF 315 may be configured to read ASN.1 and transcode the radio capability to another format (e.g., a format supported by the core network 305).

The UDM 320 may support user identification handling and subscription retrieval among other operations. For example, the UDM 320 may store and manage subscription permanent identifiers for each subscriber of a system (e.g., a 5G system). Additionally, the UDM 320 may support retrieval of subscription information for a UE 115. In some examples, the UDM 320 may store the serving AMF 310 and the serving session management function (SMF) for a packet data unit session. In some cases, the core network 305 may include a home subscriber service (HSS) or another user data management function or system in addition or alternative to the UDM 320.

The UE 115-b may register to the core network 305 by performing a registration process. For example, the UE 115-b and the core network 305 may communicate over communication link 125-a (e.g., via a base station 105 (not shown)), which may be an example of a communication link 125 as described with reference to FIG. 1. The UE 115-b may transmit a registration message (e.g., an attach request message or some other registration message) to the core network 305 over the communication link 125-a to initiate a registration process. The registration message may include a radio capability message that indicates a set of radio capabilities supported by the UE 115-b. In some cases, the UE 115-b may transmit the radio capability message and the registration message as separate messages.

The core network 305 may receive the radio capability message and may forward the radio capability message to the AMF 310. For example, a base station 105 connected to the core network 305 may receive the radio capability message and forward the radio capability message to the AMF 310. The AMF 310 may retrieve subscription information for the UE 115-b from the UDM 320 in response to receiving the radio capability message. In some examples, the UDM 320 may send the subscription information to the AMF 310 in response to the core network 305 receiving the radio capability message. The subscription information may include one or more radio capabilities that are restricted to the UE 115-b. For example, the subscription information may indicate that the UE 115-b is CAG-only (e.g., LTE and EPS restricted), LTE restricted, EPS restricted, NR restricted, 5G restricted, GERAN restricted, UMTS restricted, NB-IoT restricted, operator-specific restricted, E-UTRAN restricted, or any combination thereof. In some examples, a restriction may restrict a RAT from one or more resources (e.g., frequency bands) instead of entirely restricting the RAT.

The AMF 310 may determine mobility restriction information from the subscription information. For example, the AMF 310 may determine mobility restriction information that indicates the one or more restricted radio capabilities indicated in the subscription information. The AMF 310 may determine the set of radio capabilities supported by the UE 115-b indicated in the radio capability message and may send (e.g., input) the set of radio capabilities and the mobility restriction information to the UCMF 315. In some examples, the AMF 310 may send the set of radio capabilities and the mobility restriction information to the UCMF 315 as part of a service operation (e.g., a Nucmf_UECapabilityManagement_Assign service operation). In some cases, the AMF 310 may include the set of radio capabilities, one or more coding formats associated with the set of radio capabilities, a type allocation code, the mobility restriction information, or any combination thereof in a message sent to the UCMF 315 as part of the service operation. In some examples, the mobility information may be an enumerated value (e.g., a bit field) that indicates the one or more restricted radio capabilities.

The UCMF 315 may determine a subset of radio capabilities of the set of radio capabilities. For example, the UCMF 315 may receive the set of radio capabilities and the mobility restriction information as part of the service operation. Based on the mobility restriction information (e.g., the enumerated value), the UCMF 315 may select a filter to apply to the set of radio capabilities. In some examples, the UCMF 315 may select the filter from a set of defined filters. The UCMF 315 may select the filter such that applying the filter may remove the one or more restricted radio capabilities from the set of radio capabilities. The UCMF 315 may apply the filter to remove the one or more restricted radio capabilities and obtain a subset of radio capabilities of the set of radio capabilities that includes that non-restricted radio capabilities. For example, if the UE 115-b is CAG-only, the UCMF 315 may apply a filter that removes LTE and EPS radio capabilities from the set of radio capabilities. In some examples, the filter may be selected and applied to remove any combination of restricted radio capabilities from any set of radio capabilities.

The UCMF 315 may determine a UE radio capability ID corresponding to the subset of radio capabilities based on applying the filter. Additionally, the UCMF 315 may determine a radio capability modification indication that indicates the one or more restricted radio capabilities (e.g., explicitly or implicitly). In some examples, the UCMF 315 may store (e.g., in a lookup table or another format) a mapping from a number of sets of restricted radio capabilities to a set of respective radio capability modification indication values. The UCMF 315 may determine the radio capability modification indication based on the mobility restriction information received from the AMF 310 and the mapping. For example, the mobility restriction information may indicate a set of restricted radio capabilities and the UCMF 315 may use the mapping to determine the respective radio capability modification indication from the set of restricted radio capabilities. In some cases, the mapping may be operator-specific. The UE 115-b may store a similar mapping in memory (e.g., to resolve a received radio capability modification indication to a set of restricted radio capabilities).

The UCMF 315 may output the UE radio capability ID and the radio capability modification indication to the AMF 310. In some examples, the UCMF 315 may output the UE radio capability ID and the radio capability modification indication to the AMF 310 in a single message and the radio capability modification indication, the UE radio capability ID, or both may be included as bit fields of the message. If the radio capability modification indication is included in a bit field, the bit field may correspond to an enumerated value that indicates the one or more restricted radio capabilities. In some cases, the UCMF 315 may output the UE radio capability ID and the radio capability modification indication to the AMF 310 as part of the service operation (e.g., the Nucmf_UECapabilityManagement_Assign service operation).

The AMF 310 may receive the UE radio capability ID and the radio capability modification indication and assign the UE radio capability ID to the UE 115-b. The core network 305 may transmit (e.g., via the base station 105) the UE radio capability ID and the radio capability modification indication to the UE 115-b. In some examples, the core network 305 may transmit the UE radio capability ID and the radio capability modification indication as part of a registration accept message, a UE configuration update message, a TAU accept message, an attach accept message, a GUTI re-allocation message, or any combination thereof. The UE 115-b may receive the UE radio capability ID and the radio capability modification indication and communicate with the core network 305 according to one or more radio capabilities of the subset of radio capabilities (e.g., the non-restricted radio capabilities). In some examples, the core network 305 may transmit a configuration message that includes the mapping from the set of restricted radio capabilities to the radio capability modification indication stored in the UCMF 315. In some other examples, the UE 115-*b* may be pre-configured with the mapping. The UE 115-*b* may determine the one or more restricted radio capabilities using such a mapping and the radio capability modification indication.

The core network 305 may refrain from redirecting the UE 115-*b* to a RAT or a system corresponding to a restricted radio capability based on determining the radio capability modification indication. For example, the core network 305 may store (e.g., at the AMF 310) the UE radio capability ID or the radio capability modification indication, or both. The AMF 310 may therefore identify the UE 115-*b* radio capability restrictions without retrieving the subscription information from the UDM 320 and may refrain from redirecting the UE 115-*b* to the restricted RAT or system based on storing the UE radio capability ID, or the radio capability modification indication, or both.

In some examples, the core network 305 may determine a subscription update for the UE 115-*b* and may update the UE radio capability ID and the radio capability modification indication based on the subscription update. For example, the UDM 320 may determine the subscription update that indicates a change to the restricted radio capabilities associated with the UE 115-*b*. The UDM 320 may send the subscription update to the AMF 310. The AMF 310 may determine the set of radio capabilities indicated by the radio capability message and may determine updated mobility restriction information corresponding to the updated subscription information. The AMF 310 may send (e.g., input) the set of radio capabilities and the updated mobility restriction information to the UCMF 315. The UCMF 315 may select and apply a filter to the set of radio capabilities based on the updated mobility restriction information to obtain an updated subset of radio capabilities. The UCMF 315 may determine an updated UE radio capability ID corresponding to the updated subset of radio capabilities and may determine an updated radio capability modification indication that indicates the one or more restricted radio capabilities associated with the updated subscription information. The UCMF 315 may output the updated UE radio capability ID and the updated radio capability modification indication to the AMF 310, and the AMF 310 may assign the updated UE radio capability ID to the UE 115-*b*. The core network 305 may transmit the updated UE radio capability ID and the updated radio capability modification indication to the UE 115-*b*, and the UE 115-*b* may communicate with the core network 305 according to one or more radio capabilities of the updated subset of radio capabilities.

The processes described herein may be performed by an AMF 310, an MME, or any other mobility management function; a UDM 320, an HSS, or any other user data management function; a UCMF 315; a base station 105; or any combination of these or other network devices or entities. As described herein, a network device or network entity may include an AMF 310, an MME, or any other mobility management function; a UDM 320, an HSS, or any other user data management function; a UCMF 315; a base station 105; or any combination of these. The network device or network entity may perform one or more functions supporting network-controlled disabling of UE radio capabilities as described herein.

Figure 4:
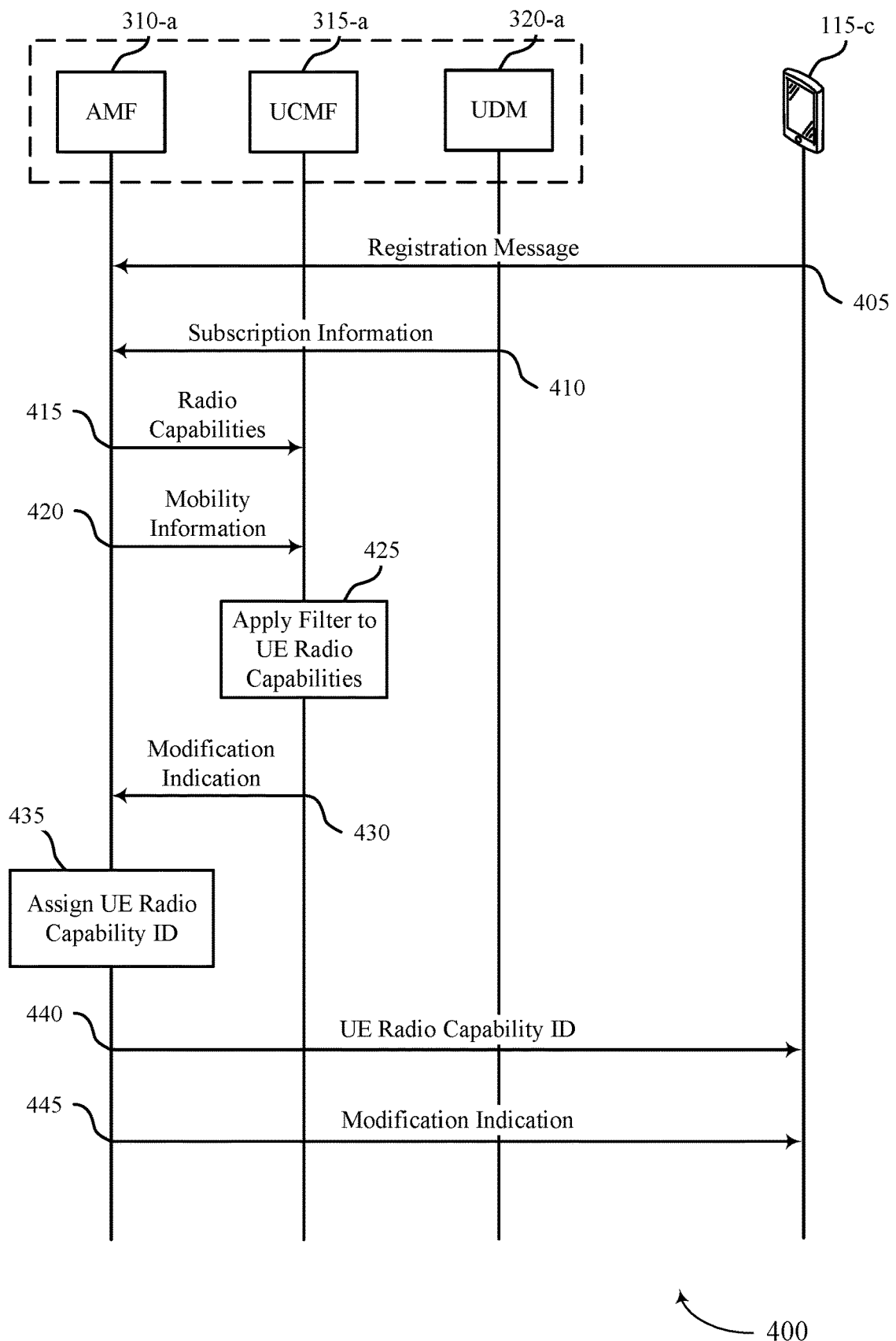
FIG. 4 illustrates an example of a process flow that supports network-controlled disabling of UE radio capabilities in accordance with aspects of the present disclosure.

FIG. 4 illustrates an example of a process flow 400 that supports network-controlled disabling of UE radio capabilities in accordance with aspects of the present disclosure. In some examples, the process flow 400 may implement aspects of the wireless communications systems 100, 200, and 300 as described with reference to FIGS. 1 through 3, respectively. The process flow 400 may be implemented by an AMF 310-*a*, a UCMF 315-*a*, a UDM 320-*a*, and a UE 115-*c* to support radio capability restriction to prevent the UE 115-*c* from reselecting to a RAT or a system corresponding to a restricted radio capability. The process flow 400 may further be implemented by the AMF 310-*a*, the UCMF 315-*a*, the UDM 320-*a*, and the UE 115-*c* to potentially reduce latency and power consumption at the UE 115-*c* (e.g., based on mitigating the communication of signaling associated with attempting to reselect to a RAT or a system corresponding to a restricted radio capability), among other benefits.

The AMF 310-*a*, the UCMF 315-*a*, and the UDM 320-*a* may be examples of an AMF 310, a UCMF 315, and a UDM 320 as described with reference to FIG. 3. The UE 115-*c* may be an example of a UE 115, as described with reference to FIGS. 1 through 3. In the following description of the process flow 400, the operations between the AMF 310-*a*, the UCMF 315-*a*, the UDM 320-*a*, and the UE 115-*c* may be communicated in a different order than the example order shown, or the operations performed by the AMF 310-*a*, the UCMF 315-*a*, the UDM 320-*a*, and the UE 115-*c* may be performed in different orders or at different times. Some operations may also be omitted from the process flow 400, and other operations may be added to the process flow 400. In some examples, the operations performed by the AMF 310-*a*, the UCMF 315-*a*, and the UDM 320-*a* may be performed by additional or alternative network devices or network entities.

At 405, the UE 115-*c* may initiate a registration procedure with the AMF 310-*a* to establish a connection with a core network. For example, the UE 115-*c* may transmit a registration message (e.g., an attach request) to the AMF 310-*a* (e.g., via a base station 105). The registration message may indicate a set of radio capabilities supported by the UE 115-*c*. In some cases, the AMF 310-*a* may be an MME or some other mobility management function.

At 410, the UDM 320-*a* may send subscription information for the UE 115-*c* to the AMF 310-*a*. For example, in response to receiving the registration message, the AMF 310-*a* may retrieve the subscription information for the UE 115-*c* from the UDM 320-*a*. The subscription information may include one or more radio capabilities restricted to the UE 115-*c*. In some cases, the UDM 320-*a* may be an HSS or some other user data management function.

At 415, the AMF 310-*a* may determine the set of radio capabilities supported by the UE 115-*c* based on receiving the registration message. The AMF 310-*a* may send the set of radio capabilities to the UCMF 315-*a* as part of a service operation.

At 420, the AMF 310-*a* may determine mobility information from the subscription information received at 410. For example, the AMF 310 may determine mobility information that indicates the one or more restricted radio capabilities indicated in the subscription information. The AMF 310-*a* may send the mobility information to the UCMF 315-*a* as part of a service operation. In some examples, 420 may occur concurrent to 415. For example, the AMF 310-*a* may send the determined set of radio capabilities and the mobility information to the UCMF 315-*a* at a same time or as part of a same message.

At 425, the UCMF 315-*a* may apply a filter to the set of radio capabilities based on the mobility information. For example, the UCMF 315-*a* may apply a filter to the set of radio capabilities to remove the one or more restricted radio capabilities indicated in the mobility information and obtain a subset of non-restricted radio capabilities. In some cases, the UCMF 315-*a* may select the filter from a set of defined filters based on the mobility information.

At 430, the UCMF 315-*a* may determine a modification indication indicating the one or more restricted radio capabilities. The UCMF 315-*a* may send (e.g., output) the modification indication to the AMF 310-*a*. In some examples, the UCMF 315-*a* may determine a UE radio capability ID corresponding to the filtered subset of non-restricted radio capabilities and may send the UE radio capability ID to the AMF 310-*a* at 430. In some cases, the UCMF 315-*a* may send the UE radio capability ID and the modification indication to the AMF 310-*a* at a same time or as part of a same message.

At 435, the AMF 310-*a* may assign the UE radio capability ID to the UE 115-*c*. In some cases, the AMF 310-*a* may store the UE radio capability ID, or the modification indication, or both.

At 440, the AMF 310-*a* may transmit (e.g., via the base station 105) the UE radio capability ID to the UE 115-*c*. At 445, the AMF 310-*a* may transmit (e.g., via the base station 105), the modification indication to the UE 115-*c*. In some examples, 445 may occur concurrent to 440. For example, the AMF 310-*a* may transmit the UE radio capability ID as part of a registration accept message, a UE configuration update message, a TAU accept message, an attach accept message, a GUTI re-allocation message, or any combination thereof, and may include the modification indication in a bit field of the message. The UE 115-*c* may receive the message and may communicate with the network that includes the AMF 310-*a*, the UCMF 315-*a*, and the UDM 320-*a* according to one or more radio capabilities of the filtered subset of non-restricted radio capabilities. For example, the UE 115-*c* may disable the restricted radio capabilities indicated by the modification indication and may refrain from autonomously reselecting to a RAT or a system corresponding to a restricted radio capability.

Figure 5:
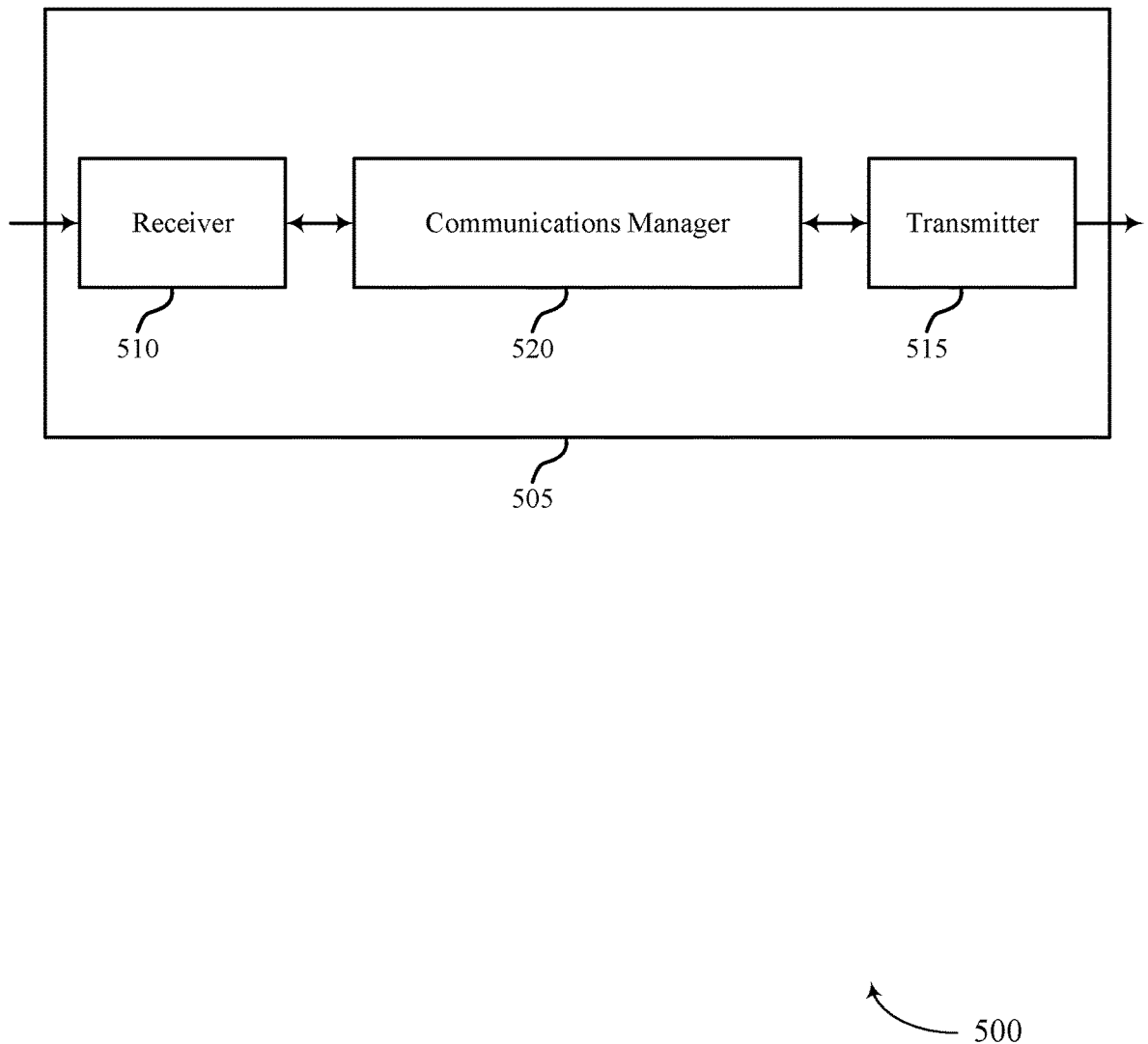
FIGS. 5 and 6 show block diagrams of devices that support network-controlled disabling of UE radio capabilities in accordance with aspects of the present disclosure.

FIG. 5 shows a block diagram 500 of a device 505 that supports network-controlled disabling of UE radio capabilities in accordance with aspects of the present disclosure. The device 505 may be an example of aspects of a UE 115 as described herein. The device 505 may include a receiver 510, a transmitter 515, and a communications manager 520. The device 505 may also include a processor (not shown). Each of these components may be in communication with one another (e.g., via one or more buses).

The receiver 510 may provide a means for receiving information such as packets, user data, control information, or any combination thereof associated with various information channels (e.g., control channels, data channels, information channels related to network-controlled disabling of UE radio capabilities). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to network-controlled disabling of UE radio capabilities). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of network-controlled disabling of UE radio capabilities as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for transmitting, to a network via a base station, a UE capability message indicating a set of UE radio capabilities. The communications manager 520 may be configured as or otherwise support a means for receiving, from the network via the base station, a message indicating a UE radio capability identifier and a radio capability modification indication, where the UE radio capability identifier corresponds to a subset of the set of UE radio capabilities based on the radio capability modification indication indicating one or more UE radio capabilities to restrict from the set of UE radio capabilities. The communications manager 520 may be configured as or otherwise support a means for communicating with the network based on the subset of the set of UE radio capabilities corresponding to the UE radio capability identifier.

By including and configuring the communications manager 520 in accordance with examples as described herein, the device 505 (e.g., a processor controlling or otherwise coupled to the receiver 510, the transmitter 515, the communications manager 520, or any combination thereof) may reduce processing resources and power consumption associated with mobility management procedures. For example, by restricting radio capabilities at the UE, the device 505 may eliminate or mitigate the communication of signaling associated with a UE attempting to reselect to a RAT or a system corresponding to a restricted radio capability.

Figure 6:
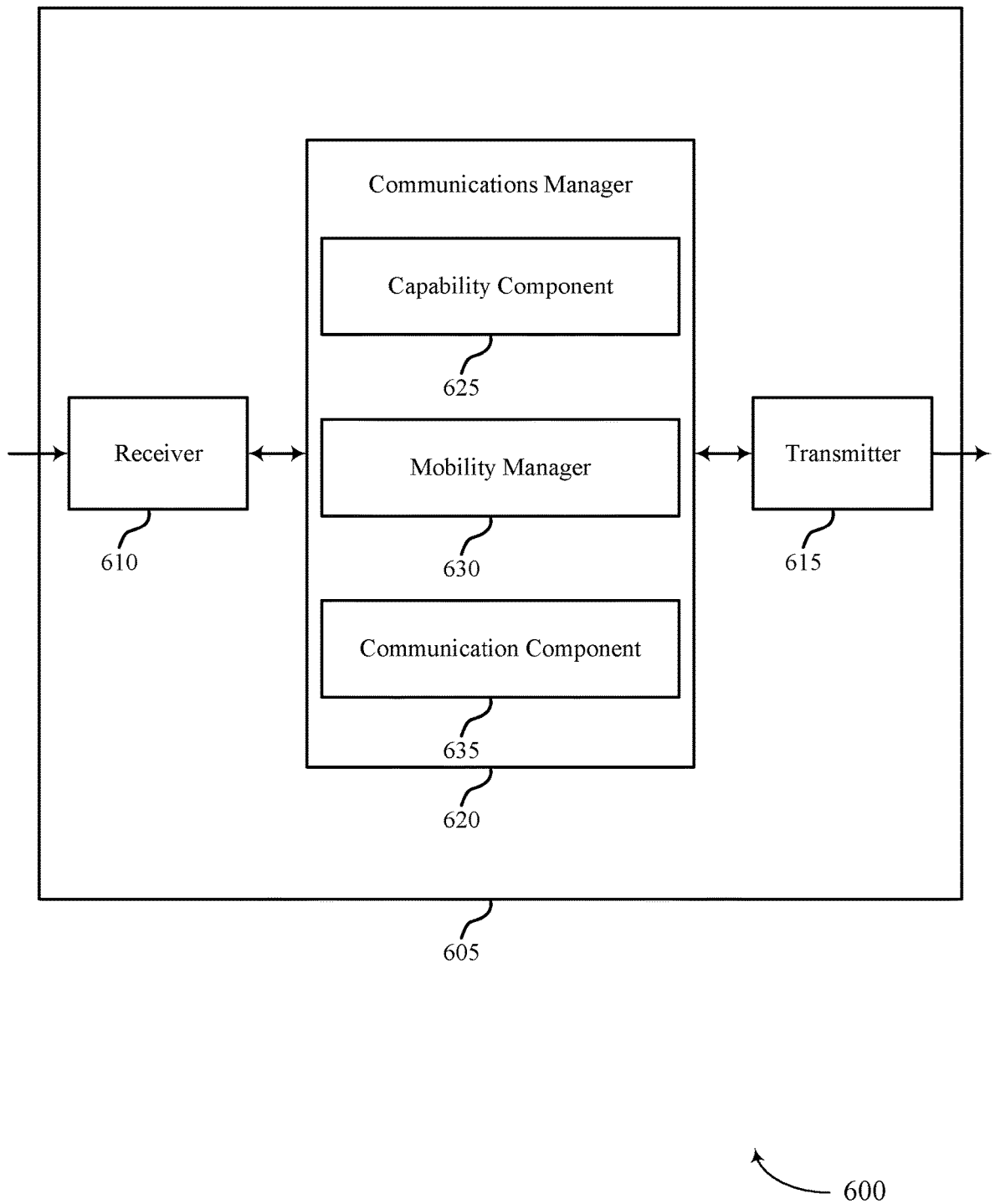

FIG. 6 shows a block diagram 600 of a device 605 that supports network-controlled disabling of UE radio capabilities in accordance with aspects of the present disclosure. The device 605 may be an example of aspects of a device 505 or a UE 115 as described herein. The device 605 may include a receiver 610, a transmitter 615, and a communications manager 620. The device 605 may also include a processor (not shown). Each of these components may be in communication with one another (e.g., via one or more buses).

The receiver 610 may provide a means for receiving information such as packets, user data, control information, or any combination thereof associated with various information channels (e.g., control channels, data channels, information channels related to network-controlled disabling of UE radio capabilities). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to network-controlled disabling of UE radio capabilities). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of network-controlled disabling of UE radio capabilities as described herein. For example, the communications manager 620 may include a capability component 625, a mobility manager 630, a communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The capability component 625 may be configured as or otherwise support a means for transmitting, to a network via a base station, a UE capability message indicating a set of UE radio capabilities. The mobility manager 630 may be configured as or otherwise support a means for receiving, from the network via the base station, a message indicating a UE radio capability identifier and a radio capability modification indication, where the UE radio capability identifier corresponds to a subset of the set of UE radio capabilities based on the radio capability modification indication indicating one or more UE radio capabilities to restrict from the set of UE radio capabilities. The communication component 635 may be configured as or otherwise support a means for communicating with the network based on the subset of the set of UE radio capabilities corresponding to the UE radio capability identifier.

Figure 7:
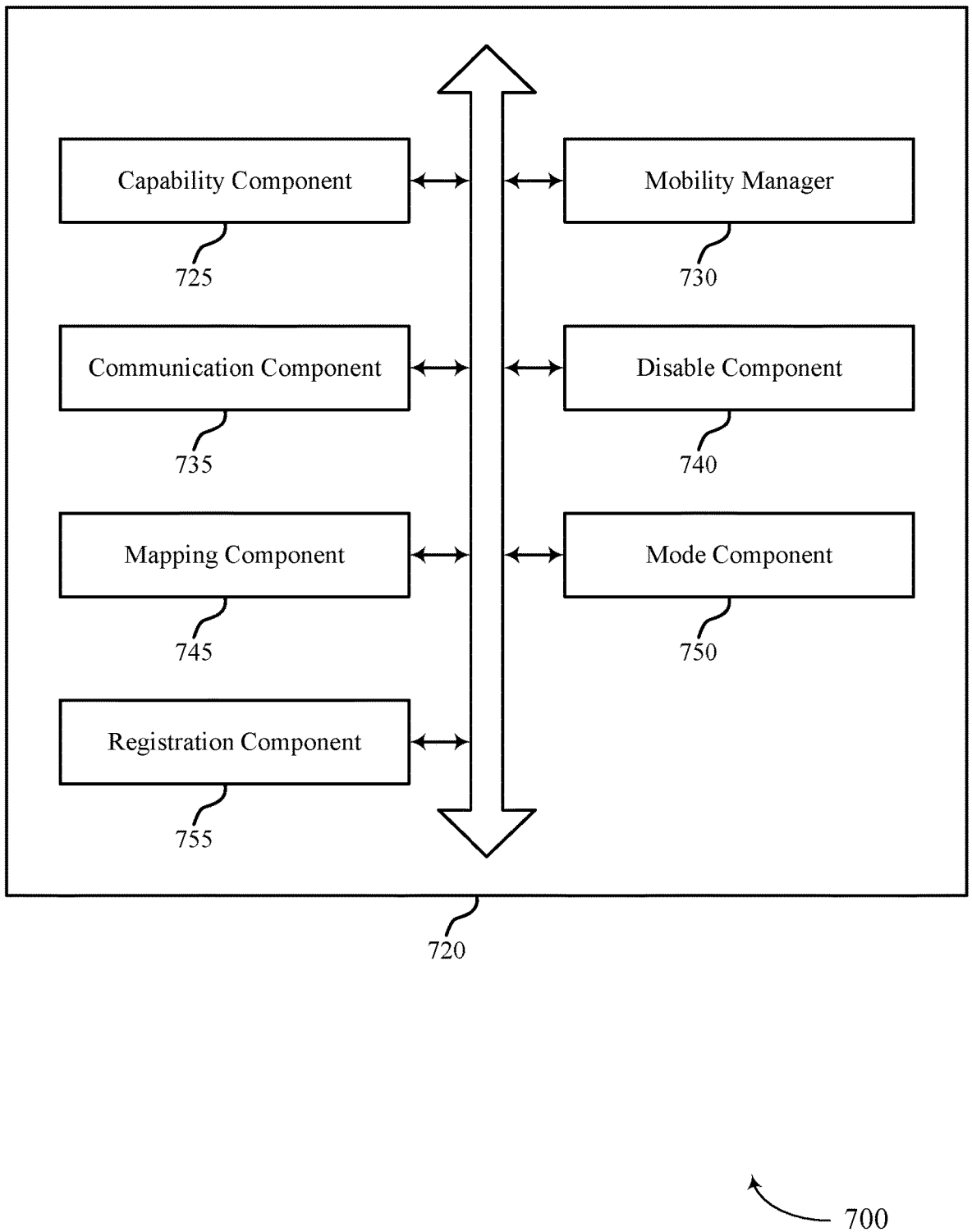
FIG. 7 shows a block diagram of a communications manager that supports network-controlled disabling of UE radio capabilities in accordance with aspects of the present disclosure.

FIG. 7 shows a block diagram 700 of a communications manager 720 that supports network-controlled disabling of UE radio capabilities in accordance with aspects of the present disclosure. The communications manager 720 may be an example of aspects of a communications manager 520, a communications manager 620, or both, as described herein. The communications manager 720, or various components thereof, may be an example of means for performing various aspects of network-controlled disabling of UE radio capabilities as described herein. For example, the communications manager 720 may include a capability component 725, a mobility manager 730, a communication component 735, a disable component 740, a mapping component 745, a mode component 750, a registration component 755, or any combination thereof. Each of these components may communicate, directly or indirectly, with one another (e.g., via one or more buses).

The communications manager 720 may support wireless communications at a UE in accordance with examples as disclosed herein. The capability component 725 may be configured as or otherwise support a means for transmitting, to a network via a base station, a UE capability message indicating a set of UE radio capabilities. The mobility manager 730 may be configured as or otherwise support a means for receiving, from the network via the base station, a message indicating a UE radio capability identifier and a radio capability modification indication, where the UE radio capability identifier corresponds to a subset of the set of UE radio capabilities based on the radio capability modification indication indicating one or more UE radio capabilities to restrict from the set of UE radio capabilities. The communication component 735 may be configured as or otherwise support a means for communicating with the network based on the subset of the set of UE radio capabilities corresponding to the UE radio capability identifier.

In some examples, the disable component 740 may be configured as or otherwise support a means for disabling the one or more UE radio capabilities for a serving PLMN corresponding to the UE radio capability identifier based on the radio capability modification indication.

In some examples, the mobility manager 730 may be configured as or otherwise support a means for refraining from reselecting to a RAT or system corresponding to one of the one or more UE radio capabilities based on the radio capability modification indication.

In some cases, the mapping component 745 may be configured as or otherwise support a means for storing a mapping from a set of multiple radio capability modification indication values to a set of multiple respective sets of UE radio capabilities to restrict from the set of UE radio capabilities. In some such cases, the mobility manager 730 may be configured as or otherwise support a means for determining the one or more UE radio capabilities based on the radio capability modification indication and the mapping.

In some examples, the mapping component 745 may be configured as or otherwise support a means for receiving a configuration message configuring the UE with the mapping. In some cases, the mapping is operator-specific.

In some examples, the mode component 750 may be configured as or otherwise support a means for entering an idle mode, where the communicating with the network based on the subset of the set of UE radio capabilities corresponding to the UE radio capability identifier is subsequent to entering the idle mode.

In some examples, the registration component 755 may be configured as or otherwise support a means for performing a registration process with the base station to register to the network, where the radio capability modification indication corresponds to subscription information for the UE based on the registration process.

In some cases, the message indicating the UE radio capability identifier and the radio capability modification indication includes a registration accept message, a UE configuration update message, a TAU accept message, an attach accept message, a GUTI re-allocation message, or any combination thereof. In some examples, the radio capability modification indication includes a bit field of the message.

In some examples, the one or more UE radio capabilities include one or more restricted RATs, one or more restricted bands for a specific RAT, or any combination thereof.

Figure 8:
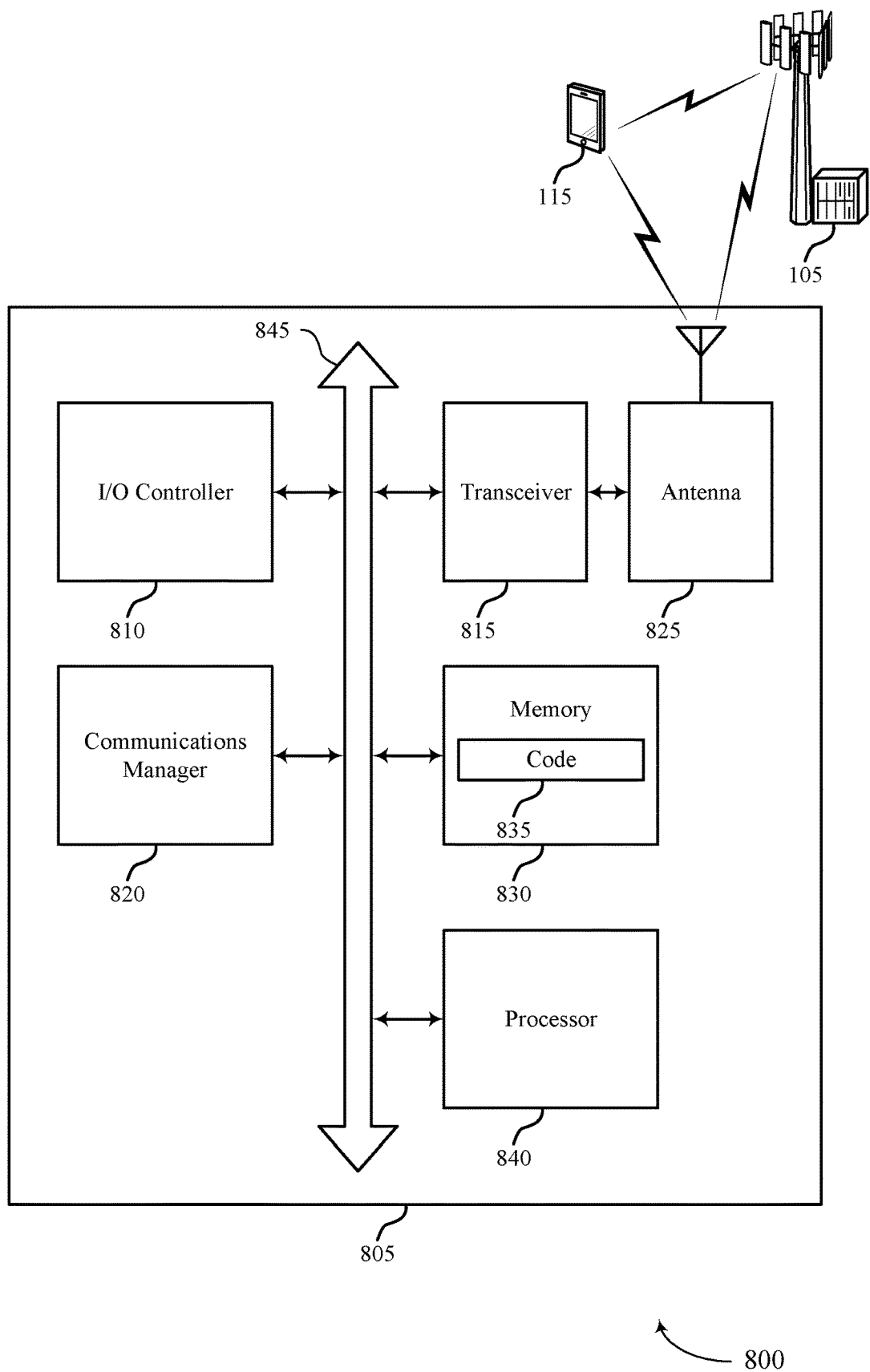
FIG. 8 shows a diagram of a system including a device that supports network-controlled disabling of UE radio capabilities in accordance with aspects of the present disclosure.

FIG. 8 shows a diagram of a system 800 including a device 805 that supports network-controlled disabling of UE radio capabilities in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting network-controlled disabling of UE radio capabilities). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting, to a network via a base station, a UE capability message indicating a set of UE radio capabilities. The communications manager 820 may be configured as or otherwise support a means for receiving, from the network via the base station, a message indicating a UE radio capability identifier and a radio capability modification indication, where the UE radio capability identifier corresponds to a subset of the set of UE radio capabilities based on the radio capability modification indication indicating one or more UE radio capabilities to restrict from the set of UE radio capabilities. The communications manager 820 may be configured as or otherwise support a means for communicating with the network based on the subset of the set of UE radio capabilities corresponding to the UE radio capability identifier.

By including or configuring the communications manager 820 in accordance with examples as described herein, the device 805 may provide improvements to mobility management operations. For example, receiving an indication of one or more restricted radio capabilities and disabling the one or more restricted radio capabilities may prevent the UE from attempting to reselect a restricted radio capability. Preventing the UE from attempting to reselect a restricted radio capability may promote improvements to efficiency and resource usage of mobility management operations and, in some examples, may promote spectral efficiency, reduce latency, reduce power consumption, improve coordination between the UE and a core network, and increase battery life, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of network-controlled disabling of UE radio capabilities as described herein, or the processor 840 and the memory 830 may be otherwise configured to perform or support such operations.

Figure 9:
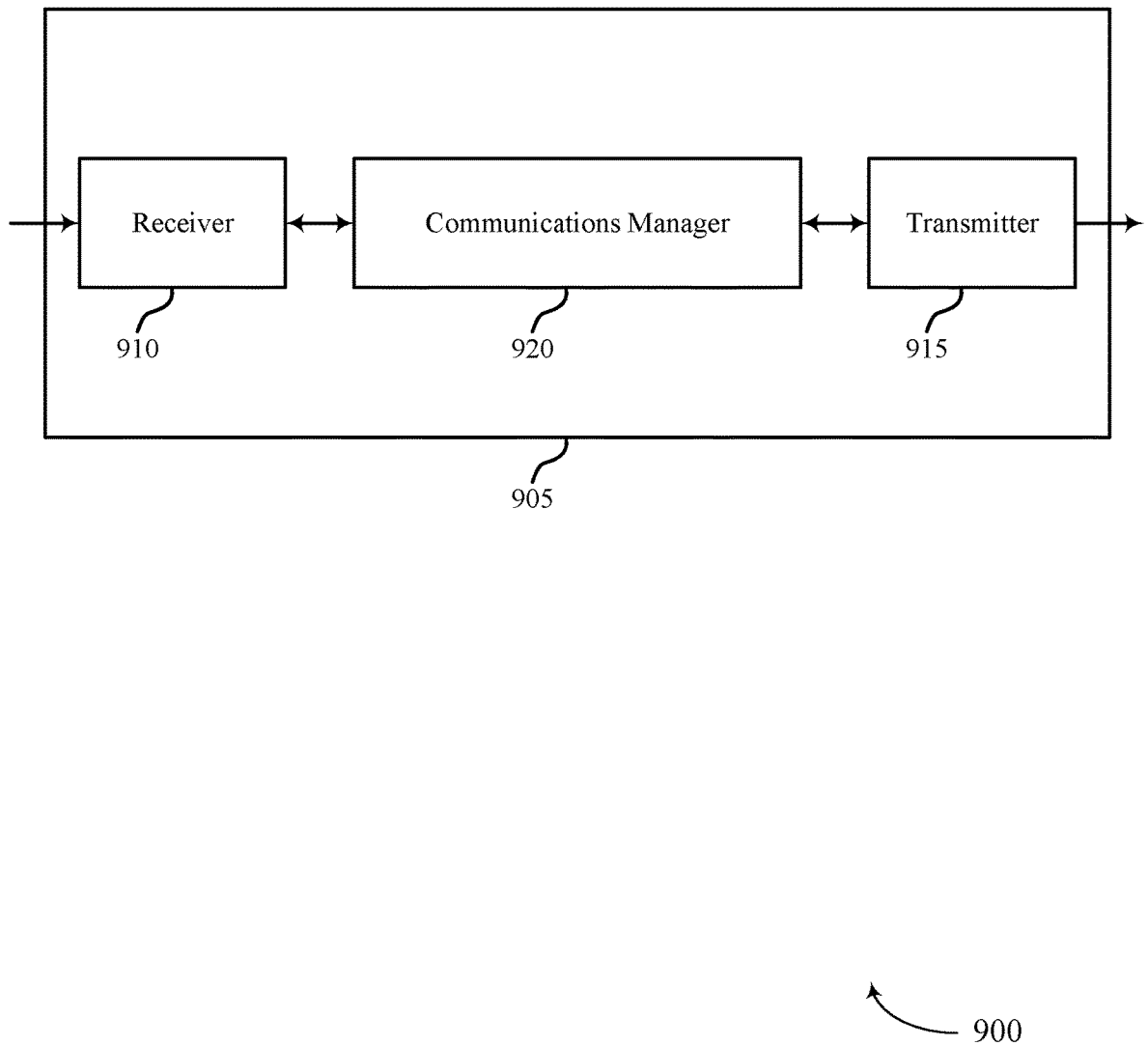
FIGS. 9 and 10 show block diagrams of devices that support network-controlled disabling of UE radio capabilities in accordance with aspects of the present disclosure.

FIG. 9 shows a block diagram 900 of a device 905 that supports network-controlled disabling of UE radio capabilities in accordance with aspects of the present disclosure. The device 905 may be an example of aspects of a base station 105 as described herein. The device 905 may include a receiver 910, a transmitter 915, and a communications manager 920. The device 905 may also include a processor (not shown). Each of these components may be in communication with one another (e.g., via one or more buses).

The receiver 910 may provide a means for receiving information such as packets, user data, control information, or any combination thereof associated with various information channels (e.g., control channels, data channels, information channels related to network-controlled disabling of UE radio capabilities). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to network-controlled disabling of UE radio capabilities). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of network-controlled disabling of UE radio capabilities as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a network device in accordance with examples as disclosed herein. For example, the communications manager 920 may be configured as or otherwise support a means for receiving, from a UE, a UE capability message indicating a set of UE radio capabilities. The communications manager 920 may be configured as or otherwise support a means for determining a radio capability modification indication for the UE based on subscription information for the UE, the radio capability modification indication indicating one or more UE radio capabilities to restrict from the set of UE radio capabilities. The communications manager 920 may be configured as or otherwise support a means for transmitting, to the UE, a message indicating a UE radio capability identifier and the radio capability modification indication, where the UE radio capability identifier corresponds to a subset of the set of UE radio capabilities based on the one or more UE radio capabilities. The communications manager 920 may be configured as or otherwise support a means for communicating with the UE based on the subset of the set of UE radio capabilities corresponding to the UE radio capability identifier.

By including or configuring the communications manager 920 in accordance with examples as described herein, the device 905 (e.g., a processor controlling or otherwise coupled to the receiver 910, the transmitter 915, the communications manager 920, or any combination thereof) may reduce processing resources and power consumption associated with mobility management procedures. For example, by indicating one or more restricted radio capabilities to a UE, the device 905 may reduce processing resources and power consumption by eliminating or mitigating the communication of signaling associated with a UE attempting to reselect to a RAT or a system supported by the network and corresponding to a restricted radio capability.

Figure 10:
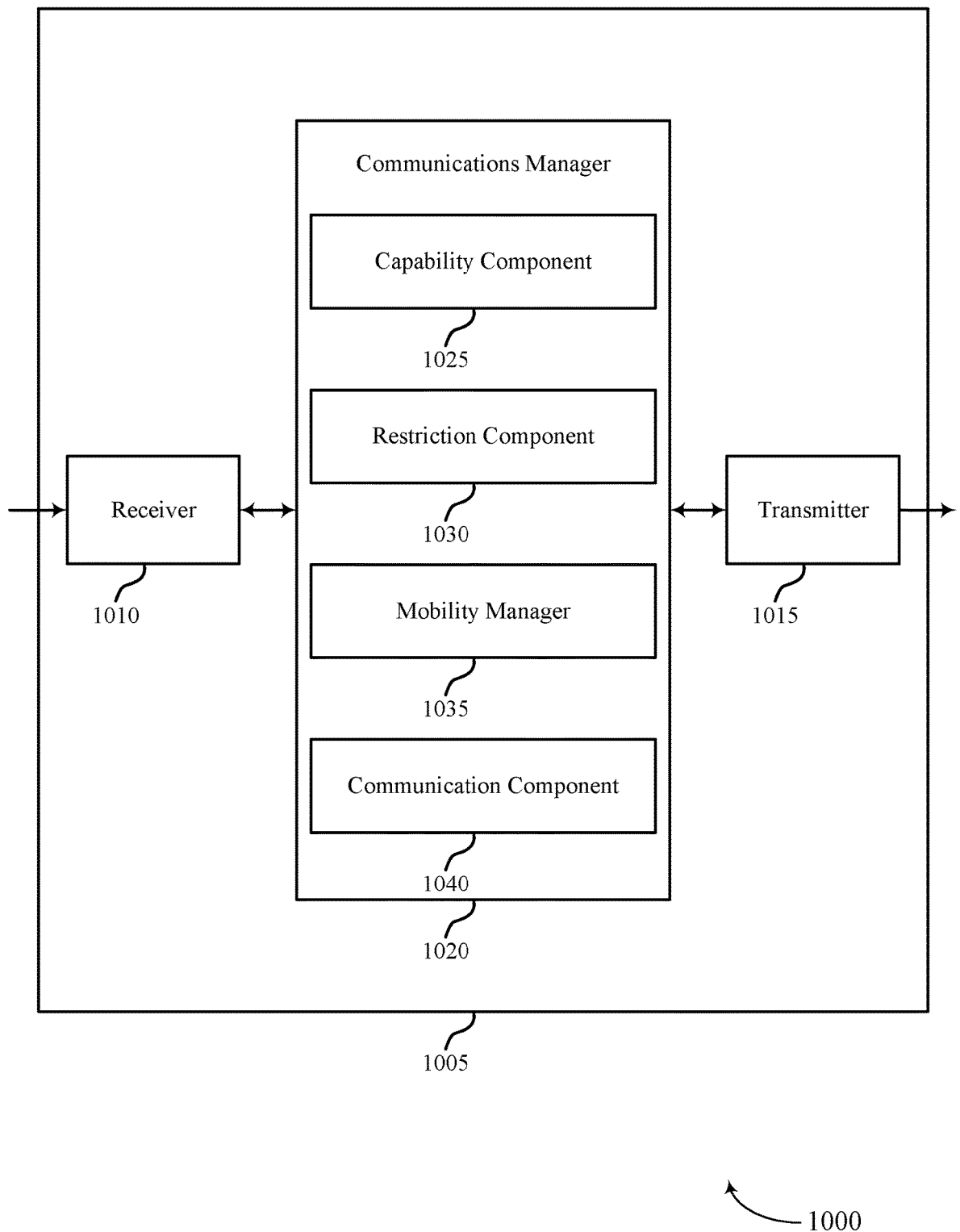

FIG. 10 shows a block diagram 1000 of a device 1005 that supports network-controlled disabling of UE radio capabilities in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor (not shown). Each of these components may be in communication with one another (e.g., via one or more buses).

The receiver 1010 may provide a means for receiving information such as packets, user data, control information, or any combination thereof associated with various information channels (e.g., control channels, data channels, information channels related to network-controlled disabling of UE radio capabilities). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to network-controlled disabling of UE radio capabilities). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of network-controlled disabling of UE radio capabilities as described herein. For example, the communications manager 1020 may include a capability component 1025, a restriction component 1030, a mobility manager 1035, a communication component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a network device in accordance with examples as disclosed herein. The capability component 1025 may be configured as or otherwise support a means for receiving, from a UE, a UE capability message indicating a set of UE radio capabilities. The restriction component 1030 may be configured as or otherwise support a means for determining a radio capability modification indication for the UE based on subscription information for the UE, the radio capability modification indication indicating one or more UE radio capabilities to restrict from the set of UE radio capabilities. The mobility manager 1035 may be configured as or otherwise support a means for transmitting, to the UE, a message indicating a UE radio capability identifier and the radio capability modification indication, where the UE radio capability identifier corresponds to a subset of the set of UE radio capabilities based on the one or more UE radio capabilities. The communication component 1040 may be configured as or otherwise support a means for communicating with the UE based on the subset of the set of UE radio capabilities corresponding to the UE radio capability identifier.

Figure 11:
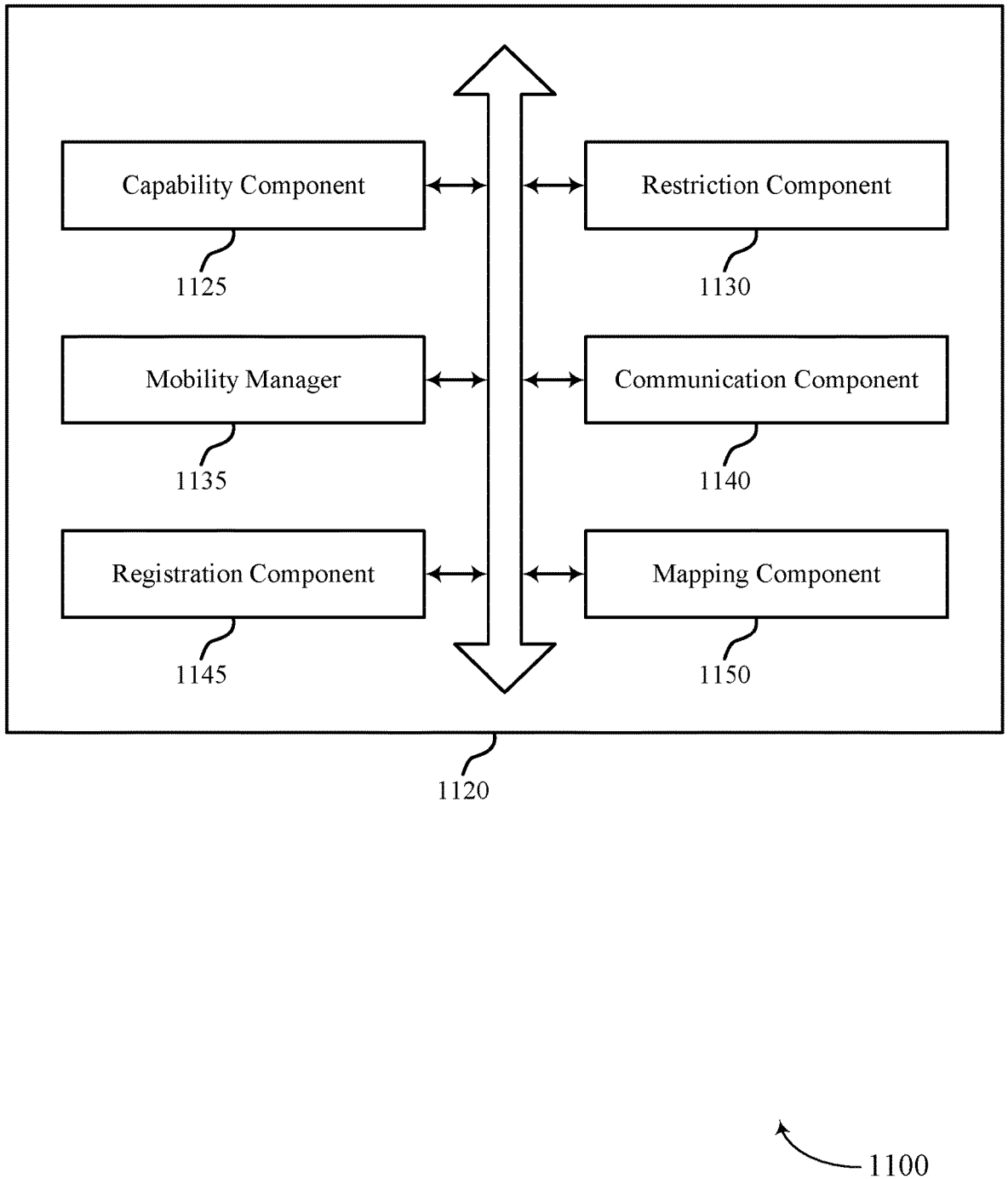
FIG. 11 shows a block diagram of a communications manager that supports network-controlled disabling of UE radio capabilities in accordance with aspects of the present disclosure.

FIG. 11 shows a block diagram 1100 of a communications manager 1120 that supports network-controlled disabling of UE radio capabilities in accordance with aspects of the present disclosure. The communications manager 1120 may be an example of aspects of a communications manager 920, a communications manager 1020, or both, as described herein. The communications manager 1120, or various components thereof, may be an example of means for performing various aspects of network-controlled disabling of UE radio capabilities as described herein. For example, the communications manager 1120 may include a capability component 1125, a restriction component 1130, a mobility manager 1135, a communication component 1140, a registration component 1145, a mapping component 1150, or any combination thereof. Each of these components may communicate, directly or indirectly, with one another (e.g., via one or more buses).

The communications manager 1120 may support wireless communications at a network device in accordance with examples as disclosed herein. The capability component 1125 may be configured as or otherwise support a means for receiving, from a UE, a UE capability message indicating a set of UE radio capabilities. The restriction component 1130 may be configured as or otherwise support a means for determining a radio capability modification indication for the UE based on subscription information for the UE, the radio capability modification indication indicating one or more UE radio capabilities to restrict from the set of UE radio capabilities. The mobility manager 1135 may be configured as or otherwise support a means for transmitting, to the UE, a message indicating a UE radio capability identifier and the radio capability modification indication, where the UE radio capability identifier corresponds to a subset of the set of UE radio capabilities based on the one or more UE radio capabilities. The communication component 1140 may be configured as or otherwise support a means for communicating with the UE based on the subset of the set of UE radio capabilities corresponding to the UE radio capability identifier.

In some examples, the registration component 1145 may be configured as or otherwise support a means for performing a registration process with the UE to register the UE to a network. In some such examples, the restriction component 1130 may be configured as or otherwise support a means for determining the subscription information for the UE based on the registration process.

In some examples, the mobility manager 1135 may be configured as or otherwise support a means for inputting, into a UCMF, at least the set of UE radio capabilities and mobility restriction information corresponding to the subscription information for the UE. In some examples, the mobility manager 1135 may be configured as or otherwise support a means for assigning, by the UCMF, the UE radio capability identifier to the subset of the set of UE radio capabilities based on the mobility restriction information.

In some examples, the mobility manager 1135 may be configured as or otherwise support a means for applying a filter, at the UCMF, to remove the one or more UE radio capabilities from the set of UE radio capabilities to obtain the subset of the set of UE radio capabilities, where the filter corresponds to the mobility restriction information and the assigning the UE radio capability identifier to the subset of the set of UE radio capabilities is based on the applied filter.

In some cases, the mobility manager 1135 may be configured as or otherwise support a means for selecting the filter from a set of multiple filters corresponding to a set of multiple respective enumerated mobility restriction values.

In some examples, the mobility manager 1135 may be configured as or otherwise support a means for outputting, from the UCMF, the UE radio capability identifier and the radio capability modification indication based on the assigning the UE radio capability identifier to the subset of the set of UE radio capabilities.

In some examples, the restriction component 1130 may be configured as or otherwise support a means for retrieving, from UDM or an HSS, the subscription information for the UE by an AMF or an MME, where at least the set of UE radio capabilities and the mobility restriction information are input into the UCMF by the AMF or the MME.

In some cases, the mobility restriction information includes an enumerated value indicating CAG-only, LTE restricted, EPS restricted, NR restricted, 5G system restricted, GERAN restricted, UMTS restricted, an operator-specific restriction, or any combination thereof.

In some examples, the restriction component 1130 may be configured as or otherwise support a means for determining a subscription update for one or more subscription parameters of the subscription information for the UE. In some such examples, the restriction component 1130 may be configured as or otherwise support a means for updating the radio capability modification indication for the UE based on the subscription update, the updated radio capability modification indication indicating an updated one or more UE radio capabilities to restrict from the set of UE radio capabilities. In some cases, the mobility manager 1135 may be configured as or otherwise support a means for transmitting, to the UE, a second message indicating an updated UE radio capability identifier and the updated radio capability modification indication, where the updated UE radio capability identifier corresponds to an updated subset of the set of UE radio capabilities based on the updated one or more UE radio capabilities.

In some examples, the mobility manager 1135 may be configured as or otherwise support a means for refraining from redirecting the UE to a RAT or system corresponding to one of the one or more UE radio capabilities based on the radio capability modification indication.

In some examples, the mapping component 1150 may be configured as or otherwise support a means for storing a mapping from a set of multiple sets of UE radio capabilities to restrict from the set of UE radio capabilities to a set of multiple respective radio capability modification indication values. In some such examples, the restriction component 1130 may be configured as or otherwise support a means for determining the radio capability modification indication based on the one or more UE radio capabilities and the mapping.

In some examples, the mapping component 1150 may be configured as or otherwise support a means for transmitting, to the UE, a configuration message configuring the UE with the mapping. In some cases, the mapping is operator-specific.

In some examples, the message indicating the UE radio capability identifier and the radio capability modification indication includes a registration accept message, a UE configuration update message, a TAU accept message, an attach accept message, a GUTI re-allocation message, or any combination thereof. In some examples, the radio capability modification indication includes a bit field of the message.

In some examples, the one or more UE radio capabilities include one or more restricted RATs, one or more restricted bands for a specific RAT, or any combination thereof.

Figure 12:
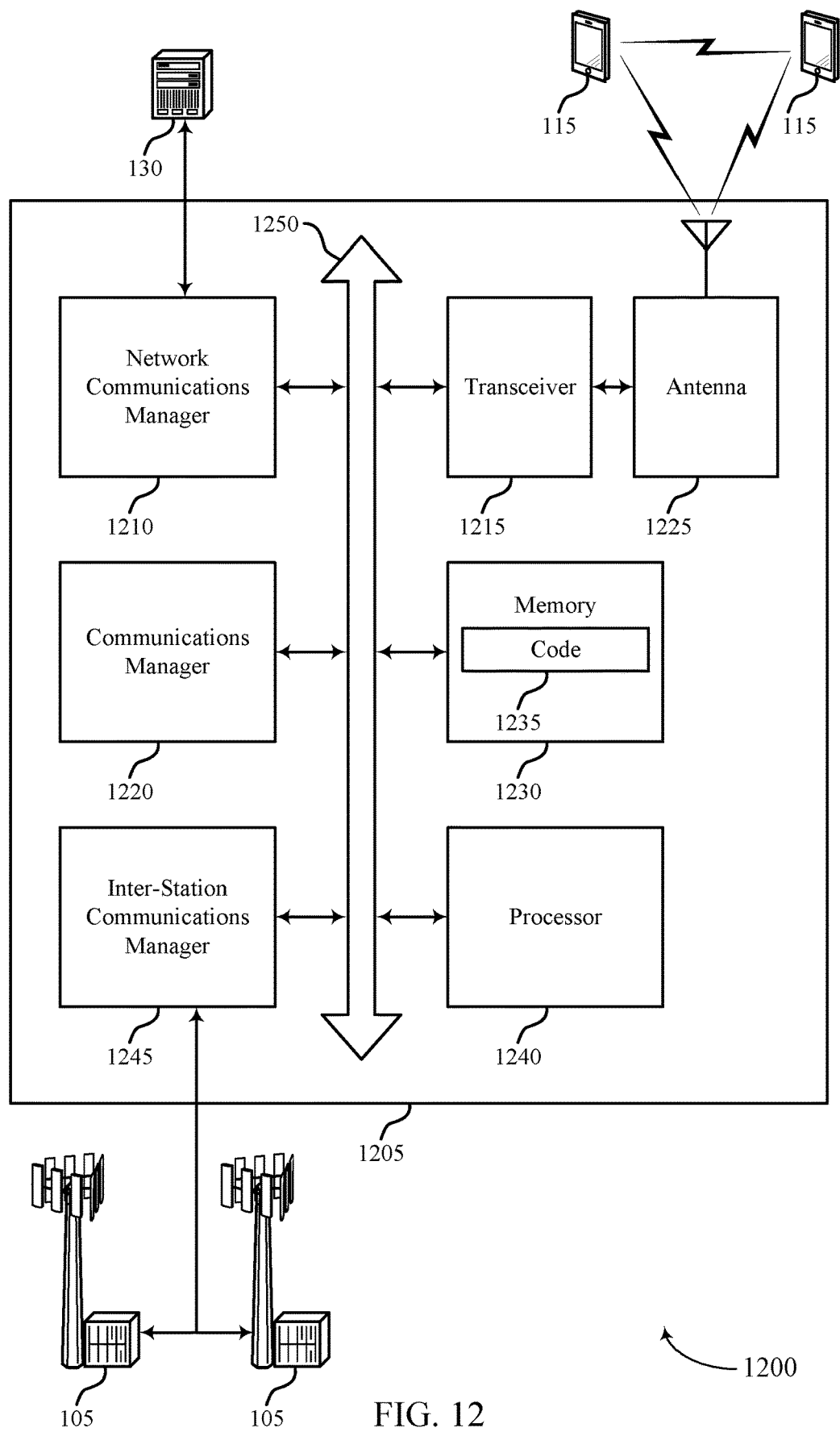
FIG. 12 shows a diagram of a system including a device that supports network-controlled disabling of UE radio capabilities in accordance with aspects of the present disclosure.

FIG. 12 shows a diagram of a system 1200 including a device 1205 that supports network-controlled disabling of UE radio capabilities in accordance with aspects of the present disclosure. The device 1205 may be an example of or include the components of a device 905, a device 1005, a base station 105, or a network device or entity as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting network-controlled disabling of UE radio capabilities). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a network device in accordance with examples as disclosed herein. For example, the communications manager 1220 may be configured as or otherwise support a means for receiving, from a UE, a UE capability message indicating a set of UE radio capabilities. The communications manager 1220 may be configured as or otherwise support a means for determining a radio capability modification indication for the UE based on subscription information for the UE, the radio capability modification indication indicating one or more UE radio capabilities to restrict from the set of UE radio capabilities. The communications manager 1220 may be configured as or otherwise support a means for transmitting, to the UE, a message indicating a UE radio capability identifier and the radio capability modification indication, where the UE radio capability identifier corresponds to a subset of the set of UE radio capabilities based on the one or more UE radio capabilities. The communications manager 1220 may be configured as or otherwise support a means for communicating with the UE based on the subset of the set of UE radio capabilities corresponding to the UE radio capability identifier.

By including or configuring the communications manager 1220 in accordance with examples as described herein, the device 1205 may provide improvements to mobility management operations. For example, indicating one or more restricted radio capabilities may prevent a UE from attempting to reselect a restricted radio capability. Preventing the UE from attempting to reselect a restricted radio capability may promote improvements to efficiency and resource usage of mobility management operations and, in some examples, may promote spectral efficiency, reduce latency, reduce power consumption, and improve coordination between the UE and the device 1205, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of network-controlled disabling of UE radio capabilities as described herein, or the processor 1240 and the memory 1230 may be otherwise configured to perform or support such operations.

Figure 13:
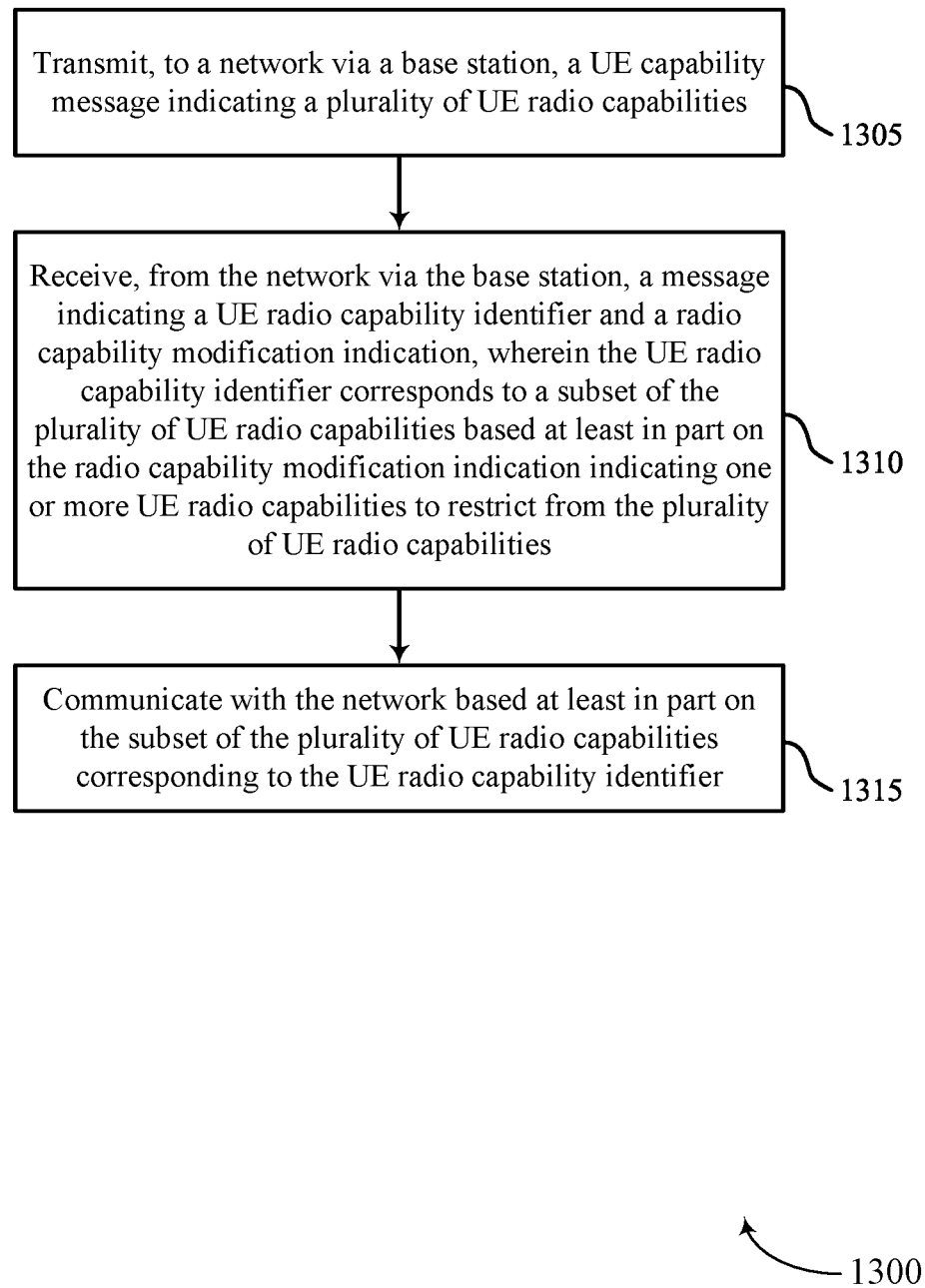
FIGS. 13 through 17 show flowcharts illustrating methods that support network-controlled disabling of UE radio capabilities in accordance with aspects of the present disclosure.

FIG. 13 shows a flowchart illustrating a method 1300 that supports network-controlled disabling of UE radio capabilities in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a network via a base station, a UE capability message indicating a set of UE radio capabilities. The operations of 1305 may be performed in accordance with examples as disclosed herein. In some examples, aspects of the operations of 1305 may be performed by a capability component 725 as described with reference to FIG. 7.

At 1310, the method may include receiving, from the network via the base station, a message indicating a UE radio capability identifier and a radio capability modification indication, where the UE radio capability identifier corresponds to a subset of the set of UE radio capabilities based on the radio capability modification indication indicating one or more UE radio capabilities to restrict from the set of UE radio capabilities. The operations of 1310 may be performed in accordance with examples as disclosed herein. In some examples, aspects of the operations of 1310 may be performed by a mobility manager 730 as described with reference to FIG. 7.

At 1315, the method may include communicating with the network based on the subset of the set of UE radio capabilities corresponding to the UE radio capability identifier. The operations of 1315 may be performed in accordance with examples as disclosed herein. In some examples, aspects of the operations of 1315 may be performed by a communication component 735 as described with reference to FIG. 7.

Figure 14:
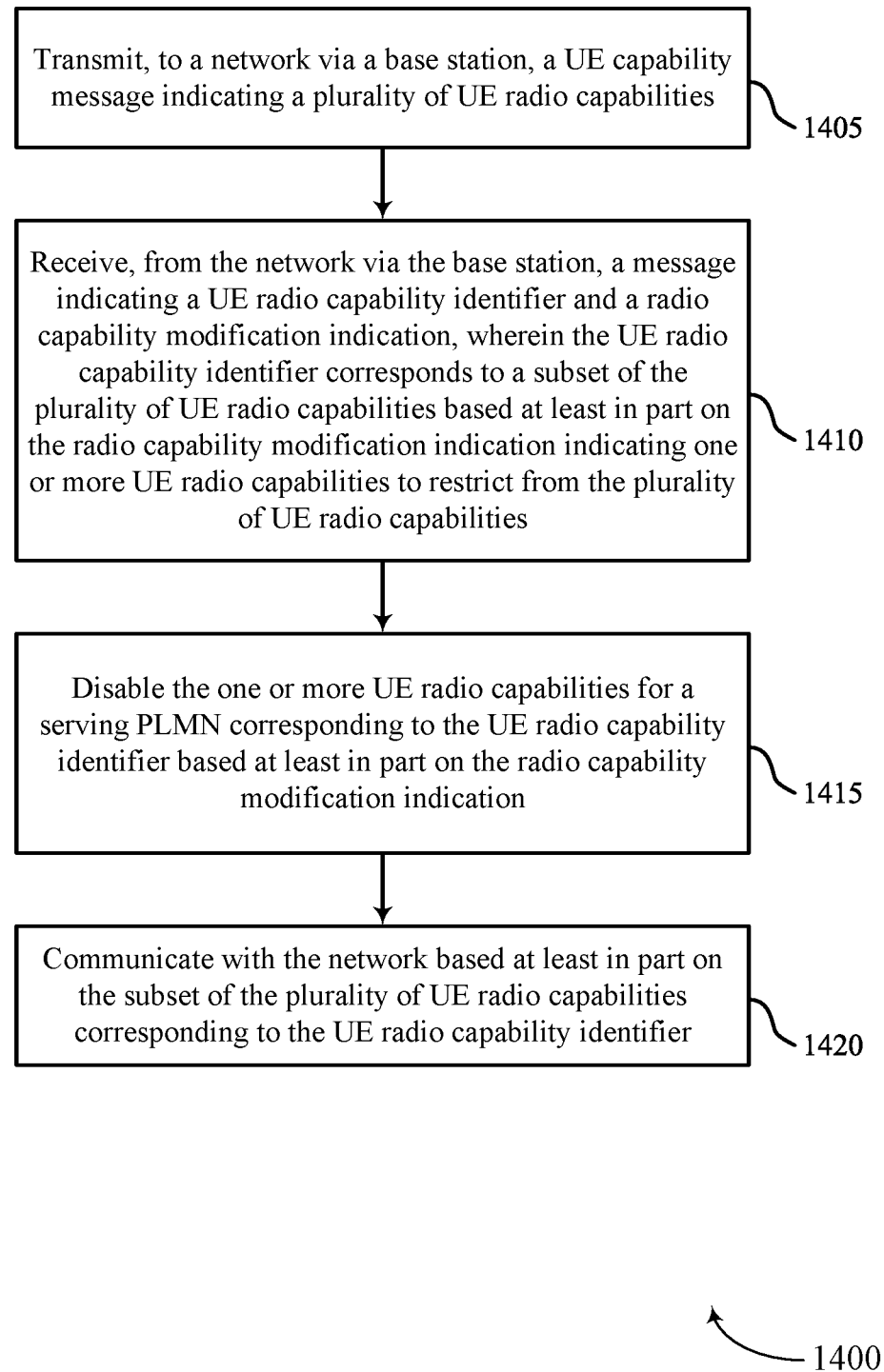

FIG. 14 shows a flowchart illustrating a method 1400 that supports network-controlled disabling of UE radio capabilities in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a network via a base station, a UE capability message indicating a set of UE radio capabilities. The operations of 1405 may be performed in accordance with examples as disclosed herein. In some examples, aspects of the operations of 1405 may be performed by a capability component 725 as described with reference to FIG. 7.

At 1410, the method may include receiving, from the network via the base station, a message indicating a UE radio capability identifier and a radio capability modification indication, where the UE radio capability identifier corresponds to a subset of the set of UE radio capabilities based on the radio capability modification indication indicating one or more UE radio capabilities to restrict from the set of UE radio capabilities. The operations of 1410 may be performed in accordance with examples as disclosed herein.

In some examples, aspects of the operations of 1410 may be performed by a mobility manager 730 as described with reference to FIG. 7.

At 1415, the method may include disabling the one or more UE radio capabilities for a serving PLMN corresponding to the UE radio capability identifier based on the radio capability modification indication. The operations of 1415 may be performed in accordance with examples as disclosed herein. In some examples, aspects of the operations of 1415 may be performed by a disable component 740 as described with reference to FIG. 7.

At 1420, the method may include communicating with the network based on the subset of the set of UE radio capabilities corresponding to the UE radio capability identifier. The operations of 1420 may be performed in accordance with examples as disclosed herein. In some examples, aspects of the operations of 1420 may be performed by a communication component 735 as described with reference to FIG. 7.

Figure 15:
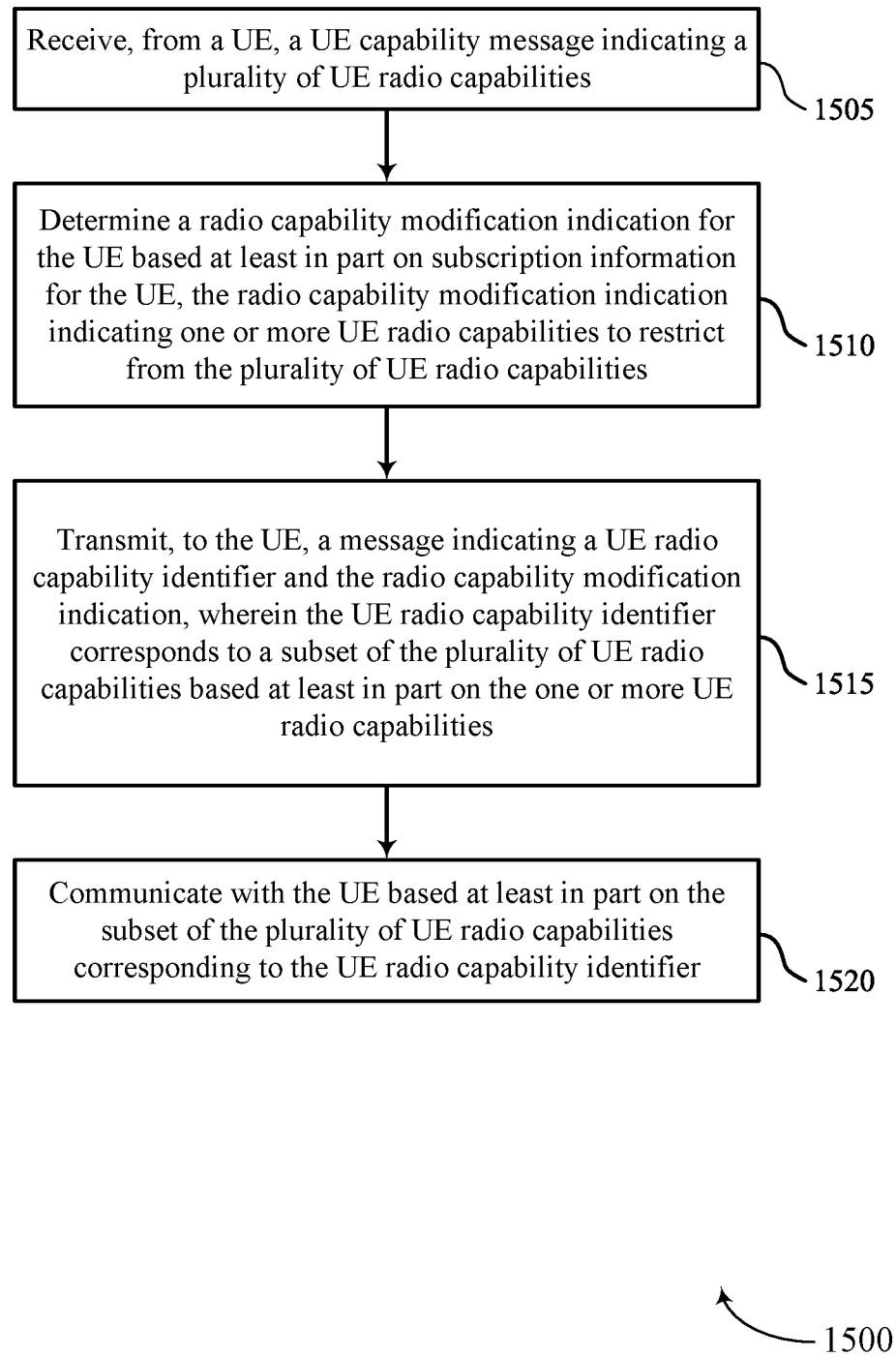

FIG. 15 shows a flowchart illustrating a method 1500 that supports network-controlled disabling of UE radio capabilities in accordance with aspects of the present disclosure. The operations of the method 1500 may be implemented by a network device or its components as described herein. For example, the operations of the method 1500 may be performed by a network device supporting or otherwise connected with a base station 105 as described with reference to FIGS. 1 through 4 and 9 through 12. In some examples, a network device may execute a set of instructions to control the functional elements of the network device to perform the described functions. Additionally or alternatively, the network device may perform aspects of the described functions using special-purpose hardware.

At 1505, the method may include receiving, from a UE, a UE capability message indicating a set of UE radio capabilities. The operations of 1505 may be performed in accordance with examples as disclosed herein. In some examples, aspects of the operations of 1505 may be performed by a capability component 1125 as described with reference to FIG. 11.

At 1510, the method may include determining a radio capability modification indication for the UE based on subscription information for the UE, the radio capability modification indication indicating one or more UE radio capabilities to restrict from the set of UE radio capabilities. The operations of 1510 may be performed in accordance with examples as disclosed herein. In some examples, aspects of the operations of 1510 may be performed by a restriction component 1130 as described with reference to FIG. 11.

At 1515, the method may include transmitting, to the UE, a message indicating a UE radio capability identifier and the radio capability modification indication, where the UE radio capability identifier corresponds to a subset of the set of UE radio capabilities based on the one or more UE radio capabilities. The operations of 1515 may be performed in accordance with examples as disclosed herein. In some examples, aspects of the operations of 1515 may be performed by a mobility manager 1135 as described with reference to FIG. 11.

At 1520, the method may include communicating with the UE based on the subset of the set of UE radio capabilities corresponding to the UE radio capability identifier. The operations of 1520 may be performed in accordance with examples as disclosed herein. In some examples, aspects of the operations of 1520 may be performed by a communication component 1140 as described with reference to FIG. 11.

Figure 16:
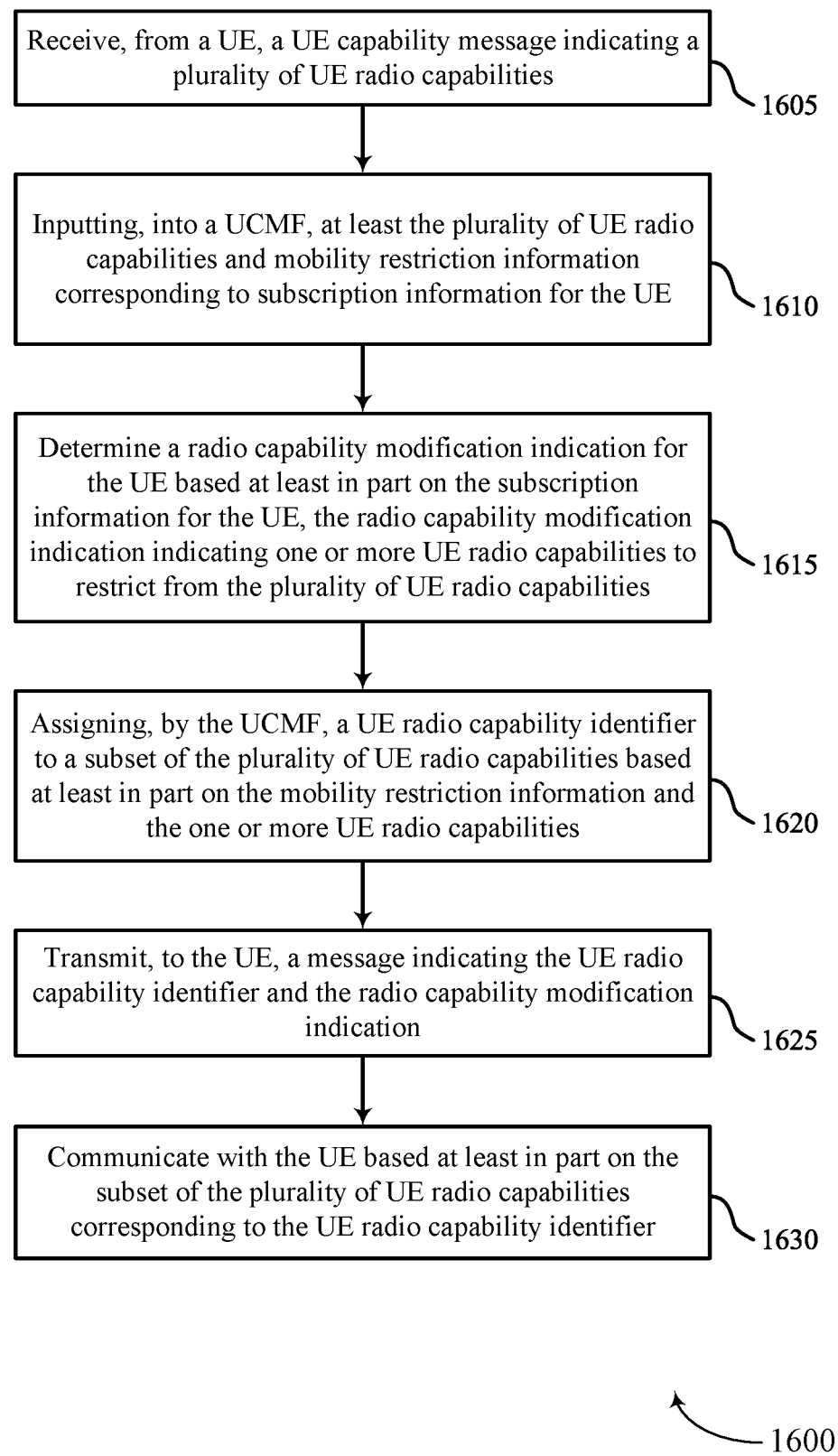

FIG. 16 shows a flowchart illustrating a method 1600 that supports network-controlled disabling of UE radio capabilities in accordance with aspects of the present disclosure. The operations of the method 1600 may be implemented by a network device or its components as described herein. For example, the operations of the method 1600 may be performed by a network device supporting or otherwise connected with a base station 105 as described with reference to FIGS. 1 through 4 and 9 through 12. In some examples, a network device may execute a set of instructions to control the functional elements of the network device to perform the described functions. Additionally or alternatively, the network device may perform aspects of the described functions using special-purpose hardware.

At 1605, the method may include receiving, from a UE, a UE capability message indicating a set of UE radio capabilities. The operations of 1605 may be performed in accordance with examples as disclosed herein. In some examples, aspects of the operations of 1605 may be performed by a capability component 1125 as described with reference to FIG. 11.

At 1610, the method may include inputting, into a UCMF, at least the set of UE radio capabilities and mobility restriction information corresponding to subscription information for the UE. The operations of 1610 may be performed in accordance with examples as disclosed herein. In some examples, aspects of the operations of 1610 may be performed by a mobility manager 1135 as described with reference to FIG. 11.

At 1615, the method may include determining a radio capability modification indication for the UE based on the subscription information for the UE, the radio capability modification indication indicating one or more UE radio capabilities to restrict from the set of UE radio capabilities. The operations of 1615 may be performed in accordance with examples as disclosed herein. In some examples, aspects of the operations of 1615 may be performed by a restriction component 1130 as described with reference to FIG. 11.

At 1620, the method may include assigning, by the UCMF, the UE radio capability identifier to the subset of the set of UE radio capabilities based on the mobility restriction information and the one or more UE radio capabilities. The operations of 1620 may be performed in accordance with examples as disclosed herein. In some examples, aspects of the operations of 1620 may be performed by a mobility manager 1135 as described with reference to FIG. 11.

At 1625, the method may include transmitting, to the UE, a message indicating the UE radio capability identifier and the radio capability modification indication. The operations of 1625 may be performed in accordance with examples as disclosed herein. In some examples, aspects of the operations of 1625 may be performed by a mobility manager 1135 as described with reference to FIG. 11.

At 1630, the method may include communicating with the UE based on the subset of the set of UE radio capabilities corresponding to the UE radio capability identifier. The operations of 1630 may be performed in accordance with examples as disclosed herein. In some examples, aspects of the operations of 1630 may be performed by a communication component 1140 as described with reference to FIG. 11.

Figure 17:
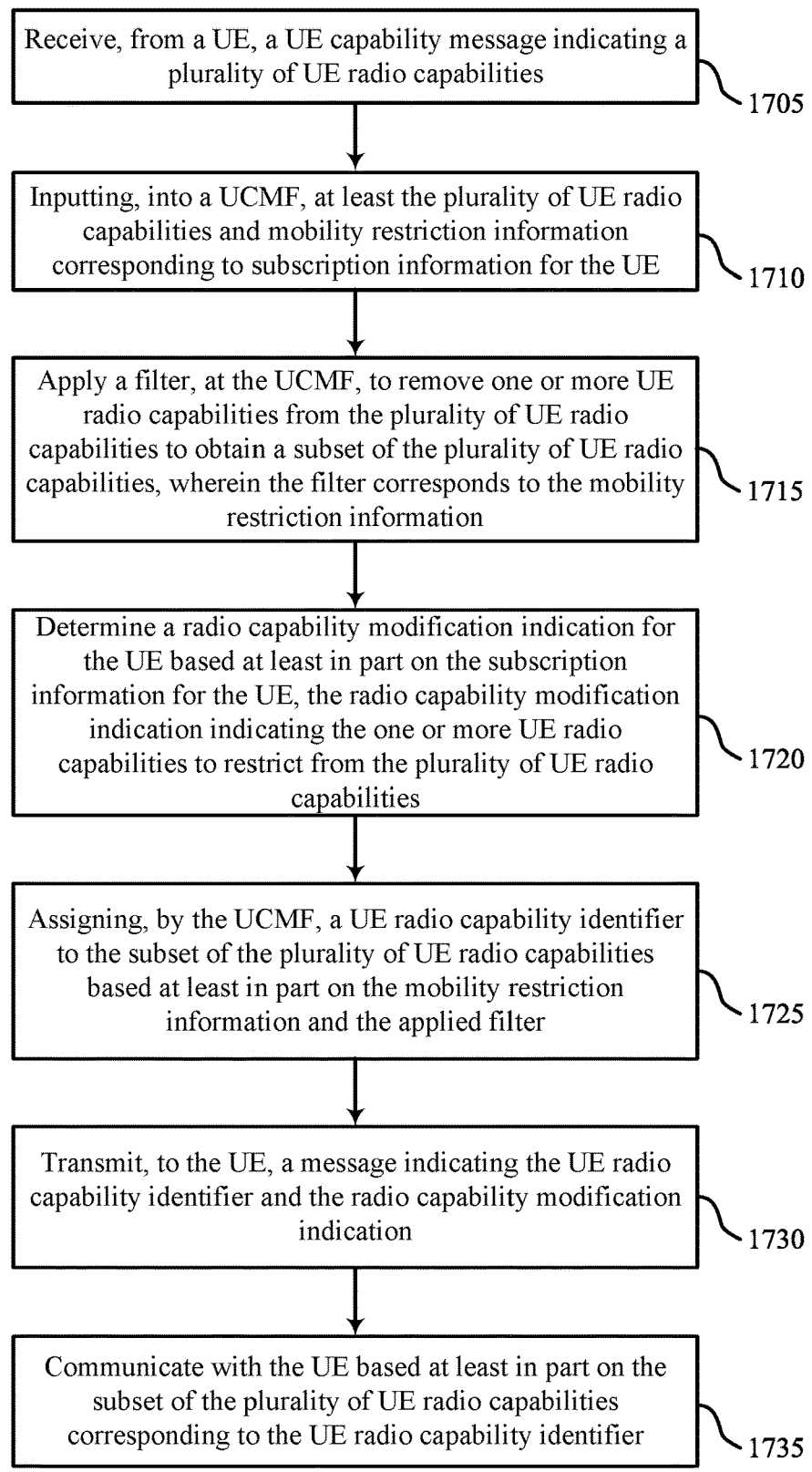

FIG. 17 shows a flowchart illustrating a method 1700 that supports network-controlled disabling of UE radio capabilities in accordance with aspects of the present disclosure. The operations of the method 1700 may be implemented by a network device or its components as described herein. For example, the operations of the method 1700 may be performed by a network device supporting or otherwise connected with a base station 105 as described with reference to FIGS. 1 through 4 and 9 through 12. In some examples, a network device may execute a set of instructions to control the functional elements of the network device to perform the described functions. Additionally or alternatively, the network device may perform aspects of the described functions using special-purpose hardware.

At 1705, the method may include receiving, from a UE, a UE capability message indicating a set of UE radio capabilities. The operations of 1705 may be performed in accordance with examples as disclosed herein. In some examples, aspects of the operations of 1705 may be performed by a capability component 1125 as described with reference to FIG. 11.

At 1710, the method may include inputting, into a UCMF, at least the set of UE radio capabilities and mobility restriction information corresponding to subscription information for the UE. The operations of 1710 may be performed in accordance with examples as disclosed herein. In some examples, aspects of the operations of 1710 may be performed by a mobility manager 1135 as described with reference to FIG. 11.

At 1715, the method may include applying a filter, at the UCMF, to remove one or more UE radio capabilities from the set of UE radio capabilities to obtain a subset of the set of UE radio capabilities, where the filter corresponds to the mobility restriction information. The operations of 1715 may be performed in accordance with examples as disclosed herein. In some examples, aspects of the operations of 1715 may be performed by a mobility manager 1135 as described with reference to FIG. 11.

At 1720, the method may include determining a radio capability modification indication for the UE based on the subscription information for the UE, the radio capability modification indication indicating the one or more UE radio capabilities to restrict from the set of UE radio capabilities. The operations of 1720 may be performed in accordance with examples as disclosed herein. In some examples, aspects of the operations of 1720 may be performed by a restriction component 1130 as described with reference to FIG. 11.

At 1725, the method may include assigning, by the UCMF, a UE radio capability identifier to the subset of the set of UE radio capabilities based on the mobility restriction information and the applied filter. The operations of 1725 may be performed in accordance with examples as disclosed herein. In some examples, aspects of the operations of 1725 may be performed by a mobility manager 1135 as described with reference to FIG. 11.

At 1730, the method may include transmitting, to the UE, a message indicating the UE radio capability identifier and the radio capability modification indication. The operations of 1730 may be performed in accordance with examples as disclosed herein. In some examples, aspects of the operations of 1730 may be performed by a mobility manager 1135 as described with reference to FIG. 11.

At 1735, the method may include communicating with the UE based on the subset of the set of UE radio capabilities corresponding to the UE radio capability identifier. The operations of 1735 may be performed in accordance with examples as disclosed herein. In some examples, aspects of the operations of 1735 may be performed by a communication component 1140 as described with reference to FIG. 11.

The following provides an overview of aspects of the present disclosure:

Aspect 1: A method for wireless communications at a UE, comprising: transmitting, to a network via a base station, a UE capability message indicating a plurality of UE radio capabilities; receiving, from the network via the base station, a message indicating a UE radio capability identifier and a radio capability modification indication, wherein the UE radio capability identifier corresponds to a subset of the plurality of UE radio capabilities based at least in part on the radio capability modification indication indicating one or more UE radio capabilities to restrict from the plurality of UE radio capabilities; and communicating with the network based at least in part on the subset of the plurality of UE radio capabilities corresponding to the UE radio capability identifier.

Aspect 2: The method of aspect 1, further comprising: disabling the one or more UE radio capabilities for a serving PLMN corresponding to the UE radio capability identifier based at least in part on the radio capability modification indication.

Aspect 3: The method of any of aspects 1 through 2, further comprising: refraining from reselecting to a RAT or system corresponding to one of the one or more UE radio capabilities based at least in part on the radio capability modification indication.

Aspect 4: The method of any of aspects 1 through 3, further comprising: storing a mapping from a plurality of radio capability modification indication values to a plurality of respective sets of UE radio capabilities to restrict from the plurality of UE radio capabilities; and determining the one or more UE radio capabilities based at least in part on the radio capability modification indication and the mapping.

Aspect 5: The method of aspect 4, further comprising: receiving a configuration message configuring the UE with the mapping.

Aspect 6: The method of any of aspects 4 through 5, wherein the mapping is operator-specific.

Aspect 7: The method of any of aspects 1 through 6, further comprising: entering an idle mode, wherein the communicating with the network based at least in part on the subset of the plurality of UE radio capabilities corresponding to the UE radio capability identifier is subsequent to entering the idle mode.

Aspect 8: The method of any of aspects 1 through 7, further comprising: performing a registration process with the base station to register to the network, wherein the radio capability modification indication corresponds to subscription information for the UE based at least in part on the registration process.

Aspect 9: The method of any of aspects 1 through 8, wherein the message indicating the UE radio capability identifier and the radio capability modification indication comprises a registration accept message, a UE configuration update message, a TAU accept message, an attach accept message, a GUTI re-allocation message, or any combination thereof; and the radio capability modification indication comprises a bit field of the message.

Aspect 10: The method of any of aspects 1 through 9, wherein the one or more UE radio capabilities comprise one or more restricted RATs, one or more restricted bands for a specific RAT, or any combination thereof.

Aspect 11: A method for wireless communications at a network device, comprising: receiving, from a UE, a UE capability message indicating a plurality of UE radio capabilities; determining a radio capability modification indication for the UE based at least in part on subscription information for the UE, the radio capability modification indication indicating one or more UE radio capabilities to restrict from the plurality of UE radio capabilities; transmitting, to the UE, a message indicating a UE radio capability identifier and the radio capability modification indication, wherein the UE radio capability identifier corresponds to a subset of the plurality of UE radio capabilities based at least in part on the one or more UE radio capabilities; and communicating with the UE based at least in part on the subset of the plurality of UE radio capabilities corresponding to the UE radio capability identifier.

Aspect 12: The method of aspect 11, further comprising: performing a registration process with the UE to register the UE to a network; and determining the subscription information for the UE based at least in part on the registration process.

Aspect 13: The method of any of aspects 11 through 12, further comprising: inputting, into a UCMF, at least the plurality of UE radio capabilities and mobility restriction information corresponding to the subscription information for the UE; and assigning, by the UCMF, the UE radio capability identifier to the subset of the plurality of UE radio capabilities based at least in part on the mobility restriction information.

Aspect 14: The method of aspect 13, further comprising: applying a filter, at the UCMF, to remove the one or more UE radio capabilities from the plurality of UE radio capabilities to obtain the subset of the plurality of UE radio capabilities, wherein the filter corresponds to the mobility restriction information and the assigning the UE radio capability identifier to the subset of the plurality of UE radio capabilities is based at least in part on the applied filter.

Aspect 15: The method of aspect 14, further comprising: selecting the filter from a plurality of filters corresponding to a plurality of respective enumerated mobility restriction values.

Aspect 16: The method of any of aspects 13 through 15, further comprising: outputting, from the UCMF, the UE radio capability identifier and the radio capability modification indication based at least in part on the assigning the UE radio capability identifier to the subset of the plurality of UE radio capabilities.

Aspect 17: The method of any of aspects 13 through 16, further comprising: retrieving, from UDM or an HSS, the subscription information for the UE by an AMF or an MME, wherein at least the plurality of UE radio capabilities and the mobility restriction information are input into the UCMF by the AMF or the MME.

Aspect 18: The method of any of aspects 13 through 17, wherein the mobility restriction information comprises an enumerated value indicating CAG-only, LTE restricted, EPS restricted, NR restricted, 5G system restricted, GERAN restricted, UMTS restricted, an operator-specific restriction, or any combination thereof.

Aspect 19: The method of any of aspects 11 through 18, further comprising: determining a subscription update for one or more subscription parameters of the subscription information for the UE; updating the radio capability modification indication for the UE based at least in part on the subscription update, the updated radio capability modification indication indicating an updated one or more UE radio capabilities to restrict from the plurality of UE radio capabilities; and transmitting, to the UE, a second message indicating an updated UE radio capability identifier and the updated radio capability modification indication, wherein the updated UE radio capability identifier corresponds to an updated subset of the plurality of UE radio capabilities based at least in part on the updated one or more UE radio capabilities.

Aspect 20: The method of any of aspects 11 through 19, further comprising: refraining from redirecting the UE to a RAT or system corresponding to one of the one or more UE radio capabilities based at least in part on the radio capability modification indication.

Aspect 21: The method of any of aspects 11 through 20, further comprising: storing a mapping from a plurality of sets of UE radio capabilities to restrict from the plurality of UE radio capabilities to a plurality of respective radio capability modification indication values; and determining the radio capability modification indication based at least in part on the one or more UE radio capabilities and the mapping.

Aspect 22: The method of aspect 21, further comprising: transmitting, to the UE, a configuration message configuring the UE with the mapping.

Aspect 23: The method of any of aspects 21 through 22, wherein the mapping is operator-specific.

Aspect 24: The method of any of aspects 11 through 23, wherein the message indicating the UE radio capability identifier and the radio capability modification indication comprises a registration accept message, a UE configuration update message, a TAU accept message, an attach accept message, a GUTI re-allocation message, or any combination thereof; and the radio capability modification indication comprises a bit field of the message.

Aspect 25: The method of any of aspects 11 through 24, wherein the one or more UE radio capabilities comprise one or more restricted RATs, one or more restricted bands for a specific RAT, or any combination thereof.

Aspect 26: An apparatus for wireless communications at a UE, comprising a processor; and a memory coupled with the processor, with instructions stored in the memory, the instructions being executable by the processor to cause the apparatus to perform a method of any of aspects 1 through 10.

Aspect 27: An apparatus for wireless communications at a UE, comprising at least one means for performing a method of any of aspects 1 through 10.

Aspect 28: A non-transitory computer-readable medium storing code for wireless communications at a UE, the code comprising instructions executable by a processor to perform a method of any of aspects 1 through 10.

Aspect 29: An apparatus for wireless communications at a network device, comprising a processor; and a memory coupled with the processor, with instructions stored in the memory, the instructions being executable by the processor to cause the apparatus to perform a method of any of aspects 11 through 25.

Aspect 30: An apparatus for wireless communications at a network device, comprising at least one means for performing a method of any of aspects 11 through 25.

Aspect 31: A non-transitory computer-readable medium storing code for wireless communications at a network device, the code comprising instructions executable by a processor to perform a method of any of aspects 11 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., any combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   transmitting, to a network via a base station, a UE capability message indicating a plurality of UE radio capabilities;
   receiving, from the network via the base station, a message indicating a UE radio capability identifier and a radio capability modification indication, wherein the UE radio capability identifier corresponds to a subset of the plurality of UE radio capabilities based at least in part on the radio capability modification indication indicating one or more UE radio capabilities to restrict from the plurality of UE radio capabilities; and communicating with the network based at least in part on the subset of the plurality of UE radio capabilities corresponding to the UE radio capability identifier.

2. The method of claim 1, further comprising:

disabling the one or more UE radio capabilities for a serving public land mobile network corresponding to the UE radio capability identifier based at least in part on the radio capability modification indication.

3. The method of claim 1, further comprising:

refraining from reselecting to a radio access technology or system corresponding to one of the one or more UE radio capabilities based at least in part on the radio capability modification indication.

4. The method of claim 1, further comprising:

storing a mapping from a plurality of radio capability modification indication values to a plurality of respective sets of UE radio capabilities to restrict from the plurality of UE radio capabilities; and determining the one or more UE radio capabilities based at least in part on the radio capability modification indication and the mapping.

5. The method of claim 4, further comprising:

receiving a configuration message configuring the UE with the mapping.

6. The method of claim 4, wherein the mapping is operator-specific.

7. The method of claim 1, further comprising:

entering an idle mode, wherein the communicating with the network based at least in part on the subset of the plurality of UE radio capabilities corresponding to the UE radio capability identifier is subsequent to entering the idle mode.

8. The method of claim 1, further comprising:

performing a registration process with the base station to register to the network, wherein the radio capability modification indication corresponds to subscription information for the UE based at least in part on the registration process.

9. The method of claim 1, wherein:

the message indicating the UE radio capability identifier and the radio capability modification indication comprises a registration accept message, a UE configuration update message, a tracking area update accept message, an attach accept message, a globally unique temporary identifier re-allocation message, or any combination thereof; and the radio capability modification indication comprises a bit field of the message.

10. The method of claim 1, wherein the one or more UE radio capabilities comprise one or more restricted radio access technologies, one or more restricted bands for a specific radio access technology, or any combination thereof.

11. A method for wireless communications at a network device, comprising:

receiving, from a user equipment (UE), a UE capability message indicating a plurality of UE radio capabilities;

determining a radio capability modification indication for the UE based at least in part on subscription information for the UE, the radio capability modification indication indicating one or more UE radio capabilities to restrict from the plurality of UE radio capabilities;

transmitting, to the UE, a message indicating a UE capability identifier and the radio capability modification indication, wherein the UE radio capability identifier corresponds to a subset of the plurality of UE radio capabilities based at least in part on the one or more UE radio capabilities; and communicating with the UE based at least in part on the subset of the plurality of UE radio capabilities corresponding to the UE radio capability identifier.

12. The method of claim 11, further comprising:

performing a registration process with the UE to register the UE to a network; and determining the subscription information for the UE based at least in part on the registration process.

13. The method of claim 11, further comprising:

inputting, into a UE radio capability management function, at least the plurality of UE radio capabilities and mobility restriction information corresponding to the subscription information for the UE; and assigning, by the UE radio capability management function, the UE radio capability identifier to the subset of the plurality of UE radio capabilities based at least in part on the mobility restriction information.

14. The method of claim 13, further comprising:

applying a filter, at the UE radio capability management function, to remove the one or more UE radio capabilities from the plurality of UE radio capabilities to obtain the subset of the plurality of UE radio capabilities, wherein the filter corresponds to the mobility restriction information and the assigning the UE radio capability identifier to the subset of the plurality of UE radio capabilities is based at least in part on the applied filter.

15. The method of claim 14, further comprising:

selecting the filter from a plurality of filters corresponding to a plurality of respective enumerated mobility restriction values.

16. The method of claim 13, further comprising:

outputting, from the UE radio capability management function, the UE radio capability identifier and the radio capability modification indication based at least in part on the assigning the UE radio capability identifier to the subset of the plurality of UE radio capabilities.

17. The method of claim 13, further comprising:

retrieving, from unified data management or a home subscriber service, the subscription information for the UE by an access and mobility management function or a mobility management entity, wherein at least the plurality of UE radio capabilities and the mobility restriction information are input into the UE radio capability management function by the access and mobility management function or the mobility management entity.

18. The method of claim 13, wherein the mobility restriction information comprises an enumerated value indicating closed access group-only, Long Term Evolution restricted, evolved packet system restricted, New Radio restricted, fifth generation system restricted, global system for mobile communications edge radio access network restricted, universal mobile telecommunications system restricted, an operator-specific restriction, or any combination thereof.

19. The method of claim 11, further comprising:

determining a subscription update for one or more subscription parameters of the subscription information for the UE;

updating the radio capability modification indication for the UE based at least in part on the subscription update, the updated radio capability modification indication indicating an updated one or more UE radio capabilities to restrict from the plurality of UE radio capabilities; and transmitting, to the UE, a second message indicating an updated UE radio capability identifier and the updated radio capability modification indication, wherein the updated UE radio capability identifier corresponds to an updated subset of the plurality of UE radio capabilities based at least in part on the updated one or more UE radio capabilities.

20. The method of claim 11, further comprising:
refraining from redirecting the UE to a radio access technology or system corresponding to one of the one or more UE radio capabilities based at least in part on the radio capability modification indication.

21. The method of claim 11, further comprising:
storing a mapping from a plurality of sets of UE radio capabilities to restrict from the plurality of UE radio capabilities to a plurality of respective radio capability modification indication values; and
determining the radio capability modification indication based at least in part on the one or more UE radio capabilities and the mapping.

22. The method of claim 21, further comprising:
transmitting, to the UE, a configuration message configuring the UE with the mapping.

23. The method of claim 21, wherein the mapping is operator-specific.

24. The method of claim 11, wherein:
the message indicating the UE radio capability identifier and the radio capability modification indication comprises a registration accept message, a UE configuration update message, a tracking area update accept message, an attach accept message, a globally unique temporary identifier re-allocation message, or any combination thereof; and
the radio capability modification indication comprises a bit field of the message.

25. The method of claim 11, wherein the one or more UE radio capabilities comprise one or more restricted radio access technologies, one or more restricted bands for a specific radio access technology, or any combination thereof.

26. An apparatus for wireless communications at a user equipment (UE), comprising:
a processor; and
a memory coupled with the processor, with instructions stored in the memory, the instructions being executable by the processor to cause the apparatus to:
transmit, to a network via a base station, a UE capability message indicating a plurality of UE radio capabilities;
receive, from the network via the base station, a message indicating a UE radio capability identifier and a radio capability modification indication, wherein the UE radio capability identifier corresponds to a subset of the plurality of UE radio capabilities based at least in part on the radio capability modification indication indicating one or more UE radio capabilities to restrict from the plurality of UE radio capabilities; and communicate with the network based at least in part on the subset of the plurality of UE radio capabilities corresponding to the UE radio capability identifier.

27. The apparatus of claim 26, wherein the instructions are further executable by the processor to cause the apparatus to:
disable the one or more UE radio capabilities of the plurality of UE radio capabilities for a serving public land mobile network corresponding to the UE radio capability identifier based at least in part on the radio capability modification indication.

28. An apparatus for wireless communications at a network device, comprising:
a processor; and
a memory coupled with the processor, with instructions stored in the memory, the instructions being executable by the processor to cause the apparatus to:
receive, from a user equipment (UE), a UE capability message indicating a plurality of UE radio capabilities;
determine a radio capability modification indication for the UE based at least in part on subscription information for the UE, the radio capability modification indication indicating one or more UE radio capabilities to restrict from the plurality of UE radio capabilities;
transmit, to the UE, a message indicating a UE radio capability identifier and the radio capability modification indication, wherein the UE radio capability identifier corresponds to a subset of the plurality of UE radio capabilities based at least in part on the one or more UE radio capabilities; and
communicate with the UE based at least in part on the subset of the plurality of UE radio capabilities corresponding to the UE radio capability identifier.

29. The apparatus of claim 28, wherein the instructions are further executable by the processor to cause the apparatus to:
input, into a UE radio capability management function, at least the plurality of UE radio capabilities and mobility restriction information correspond to the subscription information for the UE; and
assign, by the UE radio capability management function, the UE radio capability identifier to the subset of the plurality of UE radio capabilities based at least in part on the mobility restriction information.

30. The apparatus of claim 29, wherein the instructions are further executable by the processor to cause the apparatus to:
apply a filter, at the UE radio capability management function, to remove the one or more UE radio capabilities from the plurality of UE radio capabilities to obtain the subset of the plurality of UE radio capabilities, wherein the filter corresponds to the mobility restriction information and the assigning the UE radio capability identifier to the subset of the plurality of UE radio capabilities is based at least in part on the applied filter.

* * * * *